(12) United States Patent
Kelly

(10) Patent No.: US 10,377,372 B2
(45) Date of Patent: Aug. 13, 2019

(54) CONTROL SYSTEM AND METHOD FOR OPTIMIZING BY MAXIMIZING THE CRUISE CONTROLLED SPEED DURING TURNING ON LOW FRICTION GROUNDS

(71) Applicant: Jaguar Land Rover Limited, Whitley, Coventry, Warwickshire (GB)

(72) Inventor: James Kelly, Solihull (GB)

(73) Assignee: Jaguar Land Rover Limited, Whitley, Coventry (GB)

(*) Notice: Subject to any disclaimer, the term of this patent is extended or adjusted under 35 U.S.C. 154(b) by 270 days.

(21) Appl. No.: 15/313,434

(22) PCT Filed: Apr. 15, 2015

(86) PCT No.: PCT/EP2015/058151
§ 371 (c)(1),
(2) Date: Nov. 22, 2016

(87) PCT Pub. No.: WO2015/176877
PCT Pub. Date: Nov. 26, 2015

(65) Prior Publication Data
US 2017/0190330 A1  Jul. 6, 2017

(30) Foreign Application Priority Data

May 22, 2014 (GB) .................................. 1409141.7

(51) Int. Cl.
*B60W 30/02* (2012.01)
*B60W 10/06* (2006.01)
(Continued)

(52) U.S. Cl.
CPC ............ *B60W 30/02* (2013.01); *B60W 10/06* (2013.01); *B60W 10/184* (2013.01);
(Continued)

(58) Field of Classification Search
CPC .. B60W 30/02; B60W 30/143; B60W 30/146; B60W 30/18145; B60W 10/06;
(Continued)

(56) References Cited

U.S. PATENT DOCUMENTS 5,361,207 A * 11/1994 Hayafune ............... F16H 59/66
477/120
6,062,659 A *  5/2000 Matsuda .................. B60T 7/12
303/155

(Continued)

FOREIGN PATENT DOCUMENTS

| DE | 102007031542 A1 | 1/2009 |
| JP | 2008239035 A | 10/2008 |
| WO | WO2013182695 A1 | 12/2013 |
| WO | WO2014027098 A1 | 2/2014 |
| WO | WO2014027113 A1 | 2/2014 |

OTHER PUBLICATIONS

Combined Search and Examination Report for application GB1409141.7, dated Nov. 20, 2014, 6 pages.
(Continued)

*Primary Examiner* — Richard A Goldman
(74) *Attorney, Agent, or Firm* — Reising Ethington P.C.

(57) ABSTRACT

A speed control system for a vehicle that: automatically causes the vehicle to operate in accordance with a target speed value, receives information relating to turning of the vehicle, receives information relating to a driving condition of the vehicle, and adjusts automatically the value of the target speed value in dependence on the information.

20 Claims, 9 Drawing Sheets

(51) Int. Cl.
*B60W 10/184* (2012.01)
*B60W 30/14* (2006.01)
*B60W 30/18* (2012.01)
*B60W 50/00* (2006.01)

(52) U.S. Cl.
CPC ........ *B60W 30/143* (2013.01); *B60W 30/146* (2013.01); *B60W 30/18145* (2013.01); *B60W 2050/0091* (2013.01); *B60W 2050/0095* (2013.01); *B60W 2420/42* (2013.01); *B60W 2510/22* (2013.01); *B60W 2520/10* (2013.01); *B60W 2520/125* (2013.01); *B60W 2520/16* (2013.01); *B60W 2520/18* (2013.01); *B60W 2540/18* (2013.01); *B60W 2550/146* (2013.01); *B60W 2550/148* (2013.01); *B60W 2720/10* (2013.01); *B60W 2720/106* (2013.01)

(58) Field of Classification Search
CPC ....... B60W 10/184; B60W 2050/0091; B60W 2050/0095; B60W 2420/42; B60W 2510/22; B60W 2520/10; B60W 2520/125; B60W 2520/16; B60W 2520/18; B60W 2540/18; B60W 2550/146; B60W 2550/148; B60W 2720/10; B60W 2720/106
USPC .......................................................... 701/98
See application file for complete search history.

(56) References Cited

U.S. PATENT DOCUMENTS

| | | | |
|---|---|---|---|
| 9,114,809 B2 | 8/2015 | Huang | |
| 9,376,108 B2 | 6/2016 | Fairgrieve et al. | |
| 2011/0178689 A1* | 7/2011 | Yasui | B60T 7/12 701/70 |
| 2012/0203440 A1* | 8/2012 | Matsunaga | B60T 7/12 701/93 |
| 2012/0290173 A1* | 11/2012 | Irie | B60W 30/10 701/41 |
| 2014/0172295 A1* | 6/2014 | Denigan | B60W 30/18145 701/468 |
| 2015/0217771 A1 | 8/2015 | Kelly et al. | |
| 2015/0224845 A1* | 8/2015 | Anderson | B60G 17/019 701/37 |
| 2015/0232093 A1 | 8/2015 | Fairgrieve et al. | |
| 2016/0159368 A1* | 6/2016 | Tuukkanen | B60W 50/08 701/24 |
| 2017/0235311 A1* | 8/2017 | Sekijima | B60W 10/06 701/25 |

OTHER PUBLICATIONS

International Search Report for International application No. PCT/EP2015/058151, dated Sep. 21, 2015, 5 pages.
Written Opinion for International application No. PCT/EP2015/058151, dated Sep. 21, 2015, 6 pages.

* cited by examiner

CONTROL SYSTEM AND METHOD FOR OPTIMIZING BY MAXIMIZING THE CRUISE CONTROLLED SPEED DURING TURNING ON LOW FRICTION GROUNDS

INCORPORATION BY REFERENCE

The content of UK patent applications GB2492748, GB2492655 and GB2499252 is incorporated herein by reference.

TECHNICAL FIELD

The present invention relates to vehicle speed control systems, to a controller, a vehicle, a method, a carrier medium, a computer program product, a computer readable medium or a processor.

BACKGROUND

In known vehicle speed control systems, typically referred to as cruise control systems, the vehicle speed is maintained on-road once set by the user without further intervention by the user so as to improve the driving experience for the user by reducing workload.

With typical cruise control systems, the user selects a speed at which the vehicle is to be maintained, referred to as a set-speed, and the vehicle is maintained at a target speed that is set equal to the set-speed for as long as the user does not apply a brake or, in the case of a vehicle having a manual transmission, depress a clutch pedal. The cruise control system takes its speed signal from a driveshaft speed sensor or wheel speed sensors. When the brake or the clutch is depressed, the cruise control system is disabled so that the user can override the cruise control system to change the vehicle speed without resistance from the system. If the user depresses the accelerator pedal by a sufficient amount the vehicle speed will increase, but once the user removes his foot from the accelerator pedal the vehicle reverts to the pre-set cruise speed (set-speed) by coasting.

Such systems are usually operable only above a certain speed, typically around 15-20 kph, and are ideal in circumstances in which the vehicle is travelling in steady traffic conditions, and particularly on highways or motorways. In congested traffic conditions, however, where vehicle speed tends to vary widely, cruise control systems are ineffective, and especially where the systems are inoperable because of a minimum speed requirement. A minimum speed requirement is often imposed on cruise control systems so as to reduce the likelihood of low speed collision, for example when parking. Such systems are therefore ineffective in certain driving conditions (e.g. low speed) and are set to be automatically disabled in such circumstances.

More sophisticated cruise control systems are integrated into the engine management system and may include an adaptive functionality which takes into account the distance to the vehicle in front using a radar-based system. For example, the vehicle may be provided with a forward-looking radar detection system so that the speed and distance of the vehicle in front is detected and a safe following speed and distance is maintained automatically without the need for user input. If the lead vehicle slows down, or another object is detected by the radar detection system, the system sends a signal to the engine or the braking system to slow the vehicle down accordingly, to maintain a safe following distance.

Known cruise control systems also cancel in the event that a wheel slip event is detected requiring intervention by a traction control system (TC system or TCS) or stability control system (SCS). Accordingly, they are not well suited to maintaining vehicle progress when driving in off road conditions where such events may be relatively common.

It is an aim of embodiments of the present invention to address disadvantages associated with the prior art.

SUMMARY OF THE INVENTION

Embodiments of the invention may be understood with reference to the appended claims.

Aspects of the present invention provide a system, a vehicle and a method.

In one aspect of the invention for which protection is sought there is provided a speed control system for a vehicle, comprising:

means for automatically causing the vehicle to operate in accordance with a target speed value, means for receiving information relating to turning of the vehicle, means for receiving information relating to a driving condition of the vehicle, and means for adjusting automatically the value of the target speed value in dependence on said information.

Such a control system has the advantage that a vehicle may be caused to travel at a speed appropriate to a turning condition of a vehicle and a driving condition. It is to be understood that if a vehicle turns too quickly a loss of vehicle composure may be experienced. Accordingly, by adjusting vehicle speed according to information in respect of turning and driving condition, vehicle composure may be maintained. The information relating to driving condition may for example including information indicative of a surface coefficient of friction between a driving surface and wheels of a vehicle, and/or information in respect of surface softness. Such information is indicative of an amount of lateral force that may be tolerated between the wheels and driving surface before an amount of skid of the vehicle exceeds an acceptable level. Accordingly, by adjusting target speed in dependence on information relating to turning of the vehicle and a driving condition of the vehicle, vehicle composure may be maintained automatically by the system when turning on different surfaces. It is to be understood that vehicle composure may be maintained at least in part by reducing skid of the vehicle when turning, i.e. reducing a difference between actual and expected yaw rate for a given steering angle, as a consequence of the reduction in speed.

It is to be understood that by setting the value of target speed value to a value that is dependent at least in part on the driving condition, in some embodiments different target speeds may be set for different driving surfaces. Accordingly, a higher target speed may be set for certain surfaces, for a given turning condition, so as not to overly compromise a rate of progress made by a vehicle over those surfaces relative to surfaces for which it is advisable that a lower target speed is set. The control system may determine the most appropriate target speed automatically, reducing a workload on a driver and enabling them to concentrate on steering the vehicle.

Optionally, the means for automatically causing the vehicle to operate in accordance with a target speed value comprises an electric controller configured to automatically cause a vehicle to operate in accordance with the target speed value.

Optionally, the means for receiving information relating to turning of a vehicle comprises the electric controller being configured to receive electrical signals indicative of turning of a vehicle.

Optionally, the means for receiving information relating to a driving condition comprises the electric controller being configured to receive electrical signals indicative of a driving condition.

Optionally, the means for adjusting automatically the value of the target speed value in dependence on said information comprises the electric controller being configured to generate a signal to automatically adjust the target speed value.

Optionally, the information relating to turning of a vehicle includes information relating to steering angle and/or an amount of lateral acceleration of a vehicle.

Thus, the controller may determine the value of the target speed, at which the vehicle should be caused to operate, in dependence on steering angle and/or the amount of lateral acceleration a vehicle experienced by a vehicle. In some embodiments, the controller may take into account rate of change of steering angle in addition or instead.

Optionally, the steering angle is one selected from amongst steering wheel angle and steerable road wheel angle.

It is to be understood that by the term steering wheel angle is meant an angle by which a steering wheel angle has been rotated with respect to a position corresponding to travel in a substantially straight ahead direction. By steerable road wheel angle is meant an angle between a current position of steerable road wheels of a vehicle and a position corresponding to travel in a substantially straight ahead direction. The steerable road wheel angle may be specified as an average angle, as between a plurality of steerable road wheels, between a current position of a plurality of steerable road wheels of a vehicle and a position of the wheels corresponding to travel in a substantially straight ahead direction.

Optionally, the information relating to driving condition comprises information relating to a driving surface over which a vehicle is driving.

Optionally, the system may be configured to obtain the information relating to a driving surface by reference to at least one selected from amongst: one or more images captured by a camera device; a value of coefficient of friction, surface_mu, between a driving surface and vehicle wheel; vehicle pitch attitude; vehicle roll attitude; suspension articulation; driving surface roughness; movement of a body of a vehicle; and movement of a body of a vehicle occupant relative to a body of a vehicle.

Optionally, the information relating to driving condition comprises information relating to a driving mode in which a vehicle is operating.

Optionally, the control system comprises a user-operable driving mode control input for selecting a driving mode of a vehicle.

Optionally, the control system comprises automatic driving mode selection means configured to select automatically a driving mode appropriate to a driving surface over which a vehicle is driving when the system is operated in an automatic driving mode selection mode, the system further comprising a user-operable automatic driving mode control input for selecting operation of the system in the automatic driving mode selection mode.

Optionally, the driving modes are control modes of at least one subsystem of a vehicle selected from amongst an engine management system, a transmission system, a steering system, a brakes system and a suspension system, the system comprising a subsystem controller for initiating control of the or each of the vehicle subsystems in the selected one of the plurality of subsystem control modes, each of the subsystem control modes corresponding to one or more different driving surfaces.

Optionally, the control system is configured to determine:
a turning maximum speed value in dependence at least in part on the information relating to turning of a vehicle and the information relating to driving condition, and
at least one further maximum speed value,
the system being configured to cause the value of target speed to be set to the lower of the turning maximum speed value and the at least one further maximum speed value.

Thus in some embodiments vehicle speed may only be reduced below the further maximum speed value if the information relating to turning of a vehicle and information relating to a driving condition are such that the turning maximum speed value is less than the further maximum speed value.

Optionally, the at least one further maximum speed value includes a user defined speed value corresponding to a maximum speed at which the user wishes to travel.

The user defined speed value may for example be a user set-speed value. The user set-speed value may be a value set by a user by providing an appropriate control input whilst travelling at a desired speed, for example by pressing a 'set plus' or 'set +' button in the conventional manner.

Optionally, the system may be configured to determine a maximum allowable rate of acceleration of a vehicle in dependence at least in part on the information relating to turning of a vehicle and the information relating to driving condition, the system being configured to limit the rate of acceleration according to the maximum allowable rate.

It is to be understood that, in some embodiments, the means for automatically causing a vehicle to operate in accordance with a target speed value may be configured substantially continually to cause the vehicle speed to be substantially equal to an instant target speed value LSP_set_speed_inst, for example by controlling a powertrain and braking system to deliver a required amount of torque to one or more wheels of a vehicle. The system may be configured to control vehicle speed, and rate of change of vehicle speed by controlling the value and rate of change of value of parameter LSP_set_speed_inst. Thus, in order to cause a value of instant vehicle speed to become equal to the target speed value according to a predetermined acceleration or speed profile, the system may cause the value of LSP_set_speed_inst to change from a value substantially equal to the instant vehicle speed to a value substantially equal to the target speed value according to the predetermined speed or acceleration profile. It is to be understood that a speed or acceleration profile may provide sufficient information to enable the system to cause vehicle speed to change at a predetermined rate, ensuring vehicle composure is maintained. Other arrangements may be useful in addition or instead.

Optionally, the system may be configured to determine a maximum allowable rate of deceleration of a vehicle in dependence at least in part on the information relating to turning of a vehicle and the information relating to driving condition, the system being configured to limit the rate of deceleration according to the maximum allowable rate.

Optionally, the system is configured to determine a required acceleration rate profile in dependence at least in part on the information relating to turning of a vehicle and the information relating to driving condition, the system being configured to cause the rate of acceleration of the vehicle to follow the required acceleration profile in order to cause vehicle speed to become substantially equal to the target speed when a difference exists between vehicle speed and target speed.

It is to be understood that this feature has the advantage that different acceleration rate profiles may be employed in dependence on turning information and driving condition, optionally in dependence on the selected driving mode.

It is to be understood that the acceleration profile may be a profile in respect of an increase in vehicle speed or a profile in respect of a decrease in vehicle speed. The system may employ one acceleration profile for one driving condition and a different acceleration profile for another driving condition, for given information in respect of turning condition, i.e. under similar turning conditions.

Optionally, the system may be configured to determine a required acceleration rate profile in dependence at least in part on a determination whether the target speed is greater than or less than instant vehicle speed.

In a further aspect of the invention for which protection is sought there is provided a vehicle comprising a system according to another aspect.

In one aspect of the invention for which protection is sought there is provided a vehicle comprising a body, a plurality of wheels, a powertrain to drive said wheels, a braking system to brake said wheels, and a system according to another aspect.

In an aspect of the invention for which protection is sought there is provided a method of controlling a vehicle comprising:

automatically causing a vehicle to operate in accordance with a target speed value;

receiving information relating to turning of a vehicle;

receiving information relating to a driving condition; and adjusting automatically the value of the target speed value in dependence on said information.

Optionally, receiving information relating to turning of a vehicle comprises receiving information relating to steering angle and an amount of lateral acceleration of a vehicle.

Optionally, receiving information relating to vehicle driving condition comprises receiving information relating to a driving surface over which a vehicle is driving.

Optionally, receiving information relating to a driving surface comprises obtaining the information relating to a driving surface by reference to at least one selected from amongst one or more images captured by a camera device, a value of coefficient of friction, surface_mu, between a driving surface and vehicle wheel, vehicle pitch attitude, vehicle roll attitude, suspension articulation, driving surface roughness, movement of a body of a vehicle and movement of a body of a vehicle occupant relative to a body of a vehicle.

Optionally, receiving information relating to driving condition comprises receiving information relating to a driving mode in which a vehicle is operating.

Optionally, receiving information relating to a driving mode comprises receiving information relating to a state of a user-operable driving mode control input for selecting a driving mode of a vehicle.

The method may comprise selecting automatically, by means of automatic driving mode selection means, a driving mode appropriate to a driving surface over which a vehicle is driving in dependence on a user-operable automatic driving mode control input for selecting operation of the system in the automatic driving mode selection mode.

Optionally, the driving modes are control modes of at least one subsystem of a vehicle selected from amongst an engine management system, a transmission system, a steering system, a brakes system and a suspension system, the method comprising initiating control of the or each of the vehicle subsystems in the selected one of the plurality of subsystem control modes, each of the subsystem control modes corresponding to one or more different driving surfaces.

The method may comprise: determining a turning maximum speed value in dependence at least in part on the information relating to turning of a vehicle and the information relating to driving condition, and determining at least one further maximum speed value, the method comprising causing the value of target speed to be set to the lower of the turning maximum speed value and the at least one further maximum speed value.

The method may comprise receiving a user defined speed value corresponding to a maximum speed at which the user wishes to travel and setting the at least one further maximum speed value substantially equal to the user defined speed value.

The method may comprise determining a maximum allowable rate of acceleration of a vehicle in dependence at least in part on the information relating to turning of a vehicle and the information relating to driving condition, and limiting the rate of acceleration of the vehicle according to the maximum allowable rate.

The method may comprise determining a maximum allowable rate of deceleration of a vehicle in dependence at least in part on the information relating to turning of a vehicle and the information relating to driving condition, and limiting the rate of deceleration of the vehicle according to the maximum allowable rate.

In one aspect of the invention for which protection is sought there is provided a carrier medium carrying computer readable code for controlling a vehicle to carry out the method of another aspect.

In one aspect of the invention for which protection is sought there is provided a computer program product executable on a processor so as to implement the method of another aspect.

In one aspect of the invention for which protection is sought there is provided a computer readable medium loaded with the computer program product of another aspect.

In one aspect of the invention for which protection is sought there is provided a processor arranged to implement the method of another aspect.

Within the scope of this application it is envisaged that the various aspects, embodiments, examples and alternatives, and in particular the individual features thereof, set out in the preceding paragraphs, in the claims and/or in the following description and drawings, may be taken independently or in any combination. For example features described in connection with one embodiment are applicable to all embodiments, unless such features are incompatible.

For the avoidance of doubt, it is to be understood that features described with respect to one aspect of the invention may be included within any other aspect of the invention, alone or in appropriate combination with one or more other features.

BRIEF DESCRIPTION OF THE DRAWINGS

One or more embodiments of the invention will now be described, by way of example only, with reference to the accompanying figures in which.

DETAILED DESCRIPTION

References herein to a block such as a function block are to be understood to include reference to items of vehicle hardware, such as electronic modules, and to software code for performing the function or action specified which may be an output that is provided responsive to one or more inputs. The code may be in the form of a software routine or function called by a main computer program, or may be code forming part of a flow of code not being a separate routine or function. Reference to function block is made for ease of explanation of the manner of operation of embodiments of the present invention.

Figure 1:
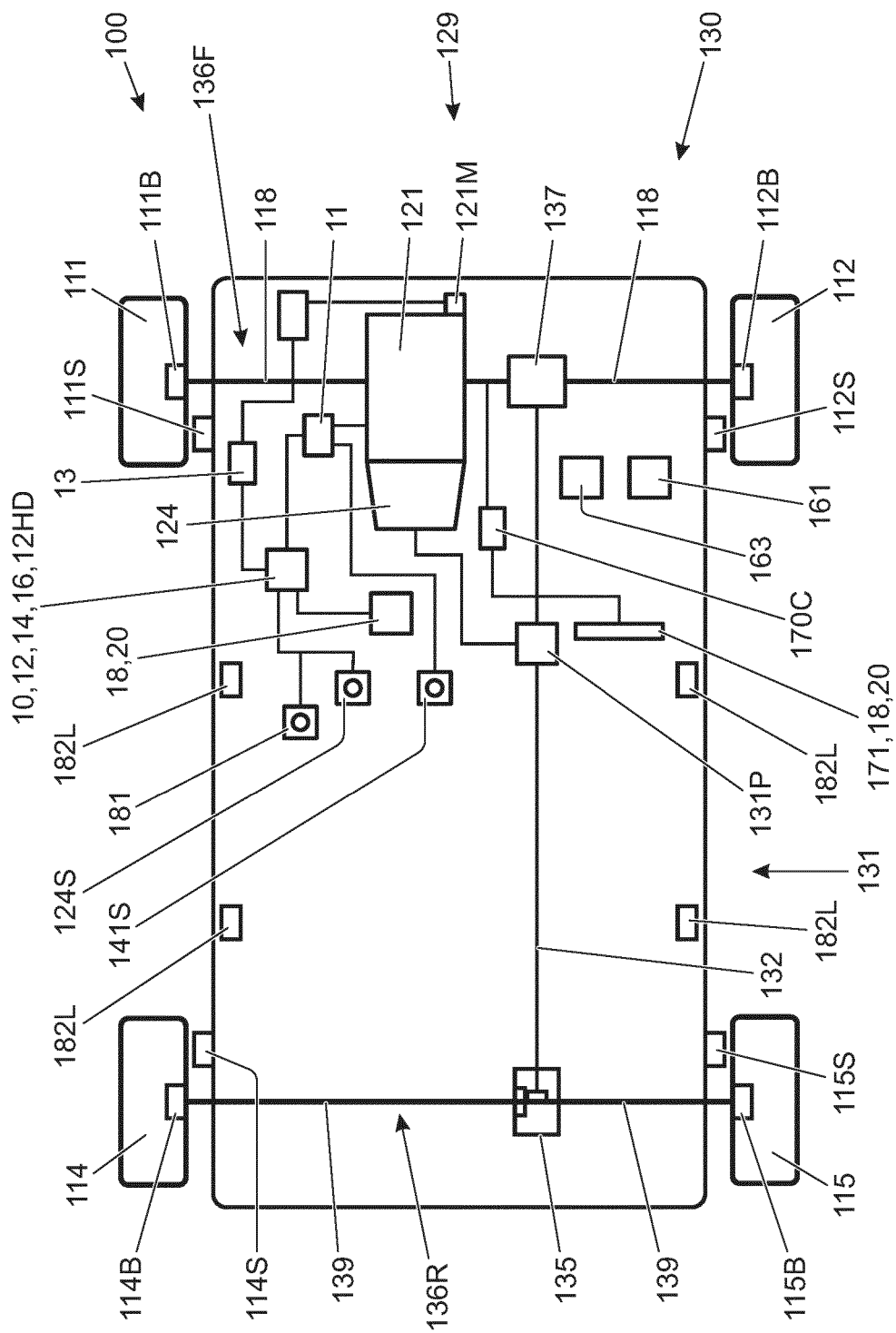
FIG. 1 is a schematic illustration of a vehicle according to an embodiment of the invention in plan view.
Figure 2:
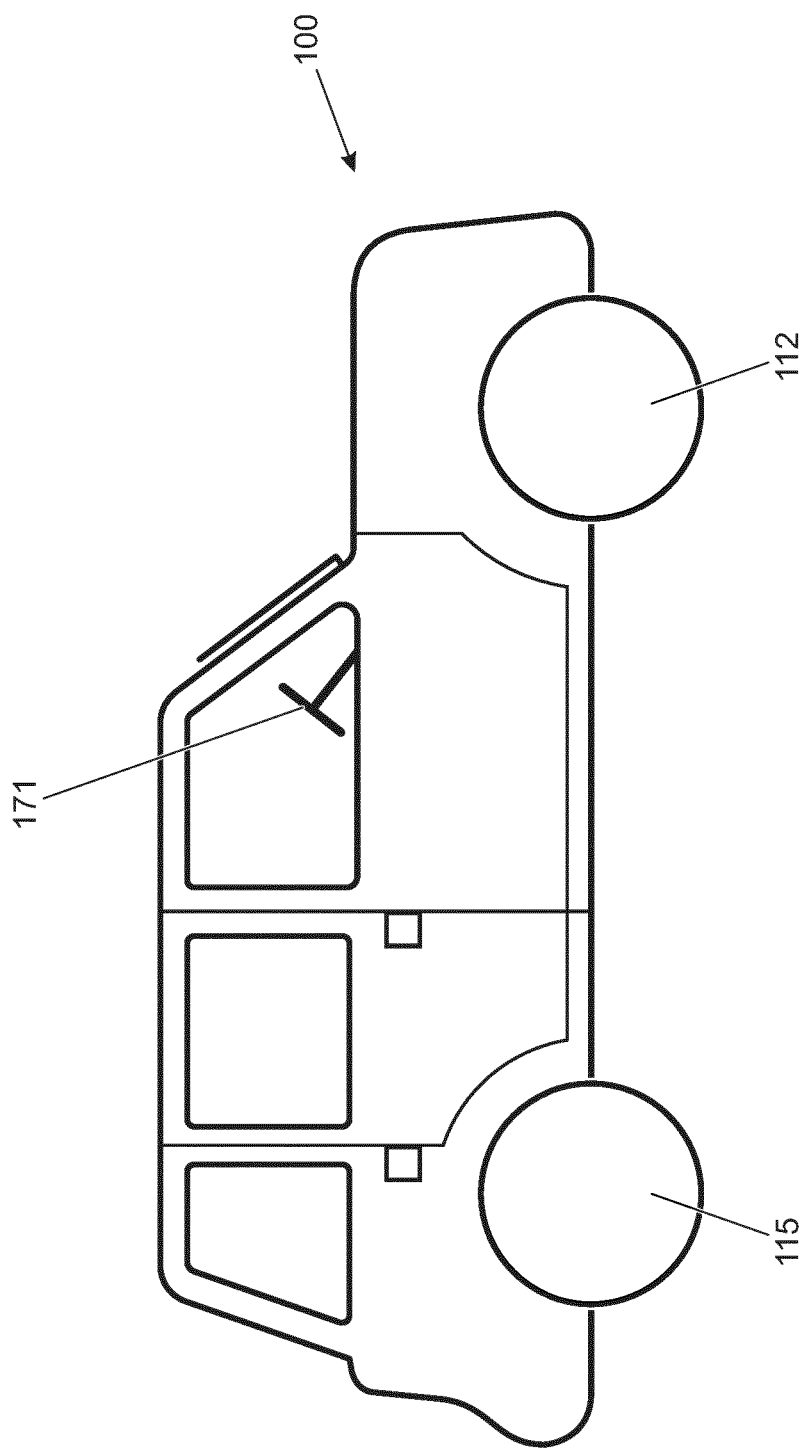
FIG. 2 shows the vehicle of FIG. 1 in side view.

FIG. 1 shows a vehicle 100 according to an embodiment of the present invention. The vehicle 100 has a powertrain 129 that includes an engine 121 that is connected to a driveline 130 having an automatic transmission 124. It is to be understood that embodiments of the present invention are also suitable for use in vehicles with manual transmissions, continuously variable transmissions or any other suitable transmission.

In the embodiment of FIG. 1 the transmission 124 may be set to one of a plurality of transmission operating modes, being a park mode P, a reverse mode R, a neutral mode N, a drive mode D or a sport mode S, by means of a transmission mode selector dial 124S. The selector dial 124S provides an output signal to a powertrain controller 11 in response to which the powertrain controller 11 causes the transmission 124 to operate in accordance with the selected transmission mode.

The driveline 130 is arranged to drive a pair of front vehicle wheels 111,112 by means of a front differential 137 and a pair of front drive shafts 118. The driveline 130 also comprises an auxiliary driveline portion 131 arranged to drive a pair of rear wheels 114, 115 by means of an auxiliary driveshaft or prop-shaft 132, a rear differential 135 and a pair of rear driveshafts 139. The front wheels 111, 112 in combination with the front drive shafts 118 and front differential 137 may be referred to as a front axle 136F. The rear wheels 114, 115 in combination with rear drive shafts 139 and rear differential 135 may be referred to as a rear axle 136R.

The wheels 111, 112, 114, 115 each have a respective brake 111B, 112B, 114B, 115B. Respective speed sensors 111S, 112S, 114S, 115S are associated with each wheel 111, 112, 114, 115 of the vehicle 100. The sensors 111S, 112S, 114S, 115S are mounted to the vehicle 100 and arranged to measure a speed of the corresponding wheel.

Embodiments of the invention are suitable for use with vehicles in which the transmission is arranged to drive only a pair of front wheels or only a pair of rear wheels (i.e. front wheel drive vehicles or rear wheel drive vehicles) or selectable two wheel drive/four wheel drive vehicles. In the embodiment of FIG. 1 the transmission 124 is releasably connectable to the auxiliary driveline portion 131 by means of a power transfer unit (PTU) 131P, allowing operation in a two wheel drive mode or a four wheel drive mode. It is to be understood that embodiments of the invention may be suitable for vehicles having more than four wheels or where only two wheels are driven, for example two wheels of a three wheeled vehicle or four wheeled vehicle or a vehicle with more than four wheels.

Figure 3:
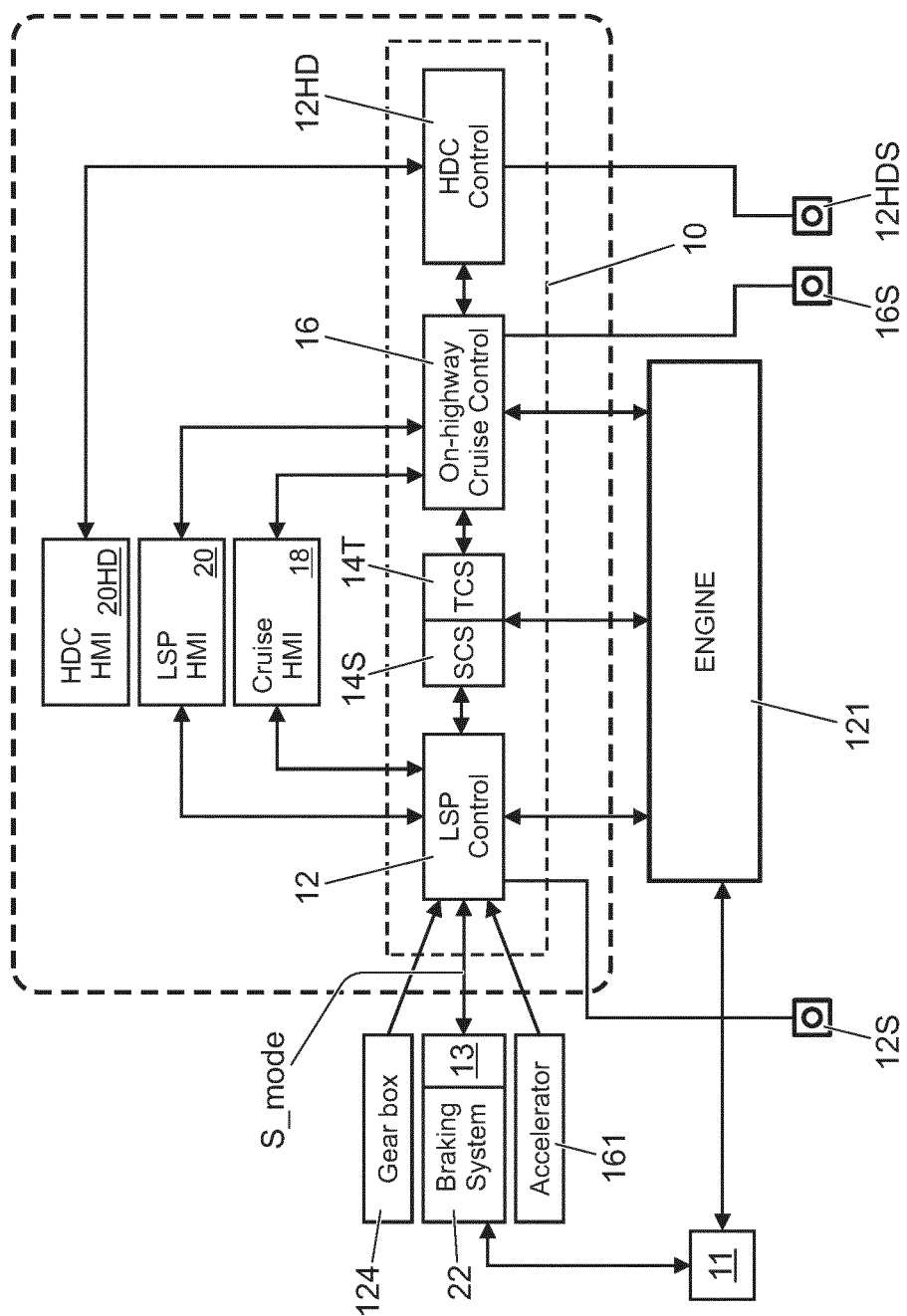
FIG. 3 is a high level schematic diagram of an embodiment of the vehicle speed control system of the present invention, including a cruise control system and a low-speed progress control system.

A control system for the vehicle 100 includes a central controller 10, referred to as a vehicle control unit (VCU) 10, the powertrain controller 11, a brake controller 13 and a steering controller 170C. The brake controller 13 is an anti-lock braking system (ABS) controller 13 and forms part of a braking system 22 (FIG. 3). The VCU 10 receives and outputs a plurality of signals to and from various sensors and subsystems (not shown) provided on the vehicle. The VCU 10 includes a low-speed progress (LSP) control system 12 shown in FIG. 3, a stability control system (SCS) 14S, a traction control system (TCS) 14T, a cruise control system 16 and a Hill Descent Control (HDC) system 12HD. The SCS 14S improves stability of the vehicle 100 by detecting and managing loss of traction when cornering. When a reduction in steering control is detected, the SCS 14S is configured automatically to command a brake controller 13 to apply one or more brakes 111B, 112B, 114B, 115B of the vehicle 100 to help to steer the vehicle 100 in the direction the user wishes to travel. If excessive wheel spin is detected, the TCS 14S is configured to reduce wheel spin by application of brake force in combination with a reduction in powertrain drive torque. In the embodiment shown the SCS 14S and TCS 14T are implemented by the VCU 10. In some alternative embodiments the SCS 14S and/or TCS 14T may be implemented by the brake controller 13. Further alternatively, the SCS 14S and/or TCS 14T may be implemented by one or more further controllers.

Similarly, one or more of the controllers 10, 11, 13, 170C may be implemented in software run on a respective one or more computing devices such as one or more electronic control units (ECUs). In some embodiments two or more of the controllers 10, 11, 13, 170C may be implemented in software run on one or more common computing devices. Two or more controllers 10, 11, 13, 170C may be implemented in software in the form of a combined software module.

It is to be understood that one or more computing devices may be configured to permit a plurality of software modules to be run on the same computing device without interference between the modules. For example the computing devices may be configured to allow the modules to run such that if execution of software code embodying a first controller terminates erroneously, or the computing device enters an unintended endless loop in respect of one of the modules, it does not affect execution of software code comprised by a software module embodying a second controller.

It is to be understood that one or more of the controllers 10, 11, 13, 170C may be configured to have substantially no single point failure modes, i.e. one or more of the controllers may have dual or multiple redundancy. It is to be understood that robust partitioning technologies are known for enabling redundancy to be introduced, such as technologies enabling isolation of software modules being executed on a common computing device. It is to be understood that the common computing device will typically comprise at least one microprocessor, optionally a plurality of processors, which may operate in parallel with one another. In some embodiments a monitor may be provided, the monitor being optionally implemented in software code and configured to raise an alert in the event a software module is determined to have malfunctioned.

The SCS 14S, TCS 14T, ABS controller 22C and HDC system 12HD provide outputs indicative of, for example, SCS activity, TCS activity and ABS activity including brake interventions on individual wheels and engine torque requests from the VCU 10 to the engine 121, for example in the event a wheel slip event occurs. Each of the aforementioned events indicate that a wheel slip event has occurred. Other vehicle sub-systems such as a roll stability control system or the like may also be present.

Figure 4:
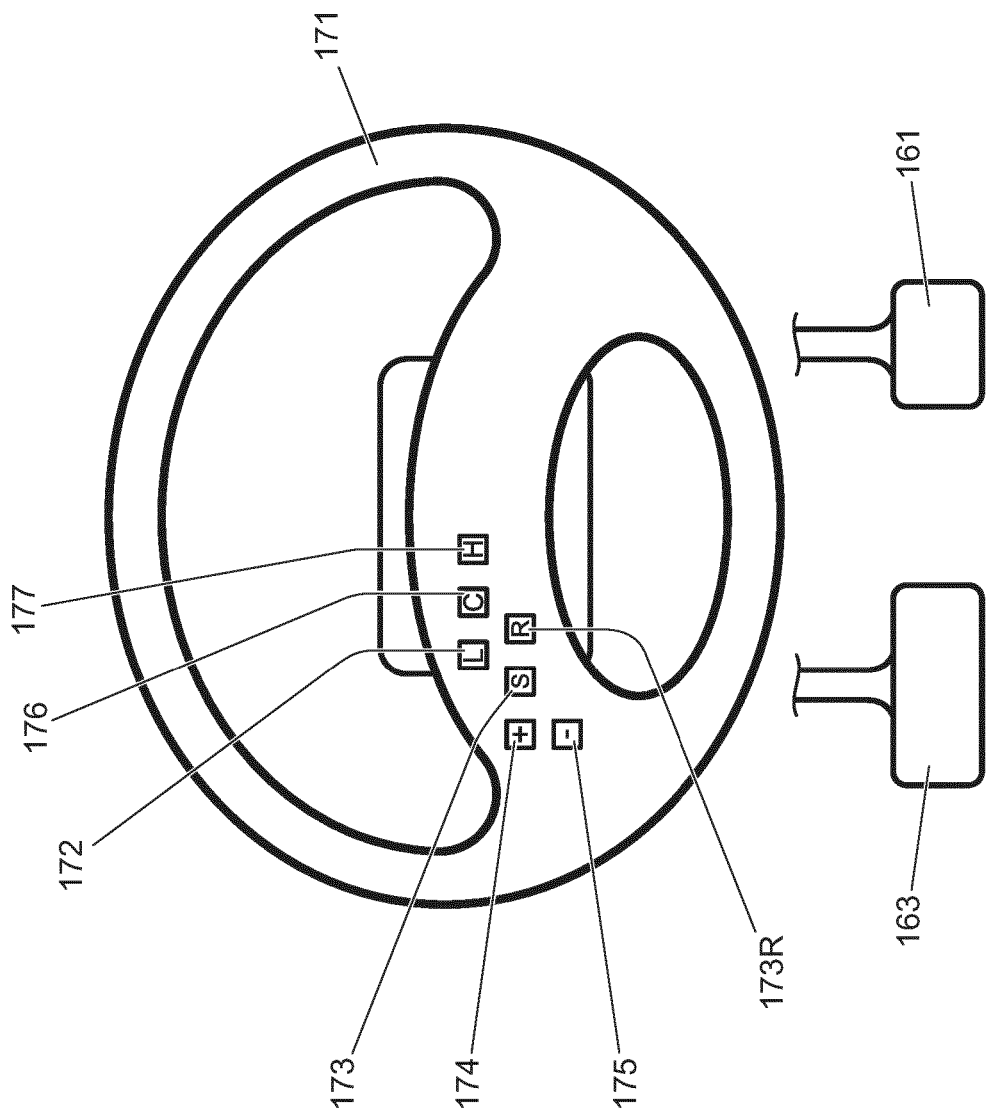
FIG. 4 illustrates a steering wheel and brake and accelerator pedals of a vehicle according to an embodiment of the present invention.

As noted above the vehicle 100 includes a cruise control system 16 which is operable to automatically maintain vehicle speed at a selected speed when the vehicle is travelling at speeds in excess of 25 kph. The cruise control system 16 is provided with a cruise control HMI (human machine interface) 18 by which means the user can input a target vehicle speed to the cruise control system 16 in a known manner. In one embodiment of the invention, cruise control system input controls are mounted to a steering wheel 171 (FIG. 4). The cruise control system 16 may be switched on by pressing a cruise control system selector button 176. When the cruise control system 16 is switched on, depression of a 'set-speed' control 173 sets the current value of a cruise control set-speed parameter, cruise_set-speed to the current vehicle speed. Depression of a '+' button 174 allows the value of cruise_set-speed to be increased whilst depression of a '−' button 175 allows the value of cruise_set-speed to be decreased. A resume button 173R is provided that is operable to control the cruise control system 16 to resume speed control at the instant value of cruise_set-speed following a driver over-ride intervention. It is to be understood that known on-highway cruise control systems including the present system 16 are configured so that, in the event that the user depresses the brake or, in the case of vehicles with a manual transmission, a clutch pedal, the cruise control function is cancelled and the vehicle 100 reverts to a manual mode of operation which requires accelerator pedal input by a user in order to maintain vehicle speed. In addition, detection of a wheel slip event, as may be initiated by a loss of traction, also has the effect of cancelling the cruise control function. Speed control by the system 16 is resumed if the driver subsequently depresses the resume button 173R.

The cruise control system 16 monitors vehicle speed and any deviation from the target vehicle speed is adjusted automatically so that the vehicle speed is maintained at a substantially constant value, typically in excess of 25 kph. In other words, the cruise control system is ineffective at speeds lower than 25 kph. The cruise control HMI 18 may also be configured to provide an alert to the user about the status of the cruise control system 16 via a visual display of the HMI 18. In the present embodiment the cruise control system 16 is configured to allow the value of cruise set-speed to be set to any value in the range 25-150 kph.

The LSP control system 12 also provides a speed-based control system for the user, which enables the user to select a very low target speed at which the vehicle can progress without any pedal inputs being required by the user. Low-speed speed control (or progress control) functionality is not provided by the on-highway cruise control system 16 which operates only at speeds above 25 kph.

The LSP control system 12 is activated by means of a LSP control system selector button 172 mounted on the steering wheel 171. The system 12 is operable to apply selective powertrain, traction control and braking actions to one or more wheels of the vehicle 100, collectively or individually, to maintain the vehicle 100 at the desired speed. It is to be understood that in some embodiments the LSP control system selector button 172 may be mounted in a location other than on the steering wheel 171, such as in a dashboard or any other suitable location.

The LSP control system 12 is configured to allow a user to input a desired value of set-speed parameter, user_set-speed to the LSP control system 12 via a low-speed progress control HMI (LSP HMI) 20 (FIG. 1, FIG. 3) which shares certain input buttons 173-175 with the cruise control system 16 and HDC control system 12HD. Provided the vehicle speed is within the allowable range of operation of the LSP control system (which is the range from 2 to 30 kph in the present embodiment although other ranges are also useful) the LSP control system 12 controls vehicle speed in accordance with the value of user_set-speed by setting a parameter LSP_set-speed equal to the value of user_set-speed unless the system 12 determines that a lower value of LSP_set-speed is required as discussed in more detail below with respect to FIG. 5. Unlike the cruise control system 16, the LSP control system 12 is configured to operate independently of the occurrence of a traction event. That is, the LSP control system 12 does not cancel speed control upon detection of wheel slip. Rather, the LSP control system 12 actively manages vehicle behaviour when slip is detected.

The LSP control HMI 20 is provided in the vehicle cabin so as to be readily accessible to the user. The user of the vehicle 100 is able to input to the LSP control system 12, via the LSP HMI 20, an indication of the speed at which the user desires the vehicle to travel, user_set-speed, by means of the 'set-speed' button 173 and the '+'/'−' buttons 174, 175 in a similar manner to the cruise control system 16. The LSP HMI 20 also includes a visual display upon which information and guidance can be provided to the user about the status of the LSP control system 12.

The LSP control system 12 receives an input from the braking system 22 of the vehicle indicative of the extent to which the user has applied braking by means of the brake pedal 163. The LSP control system 12 also receives an input from an accelerator pedal 161 indicative of the extent to which the user has depressed the accelerator pedal 161. An input is also provided to the LSP control system 12 from the transmission or gearbox 124. This input may include signals representative of, for example, the speed of an output shaft of the gearbox 124, torque converter slip and a gear ratio request. Other inputs to the LSP control system 12 include an input from the cruise control HMI 18 which is representative of the status (ON/OFF) of the cruise control system 16, and an input from the LSP control HMI 20.

The HDC system 12HD is configured to limit vehicle speed when descending a gradient. When the HDC system 12HD is active, the system 12HD controls the braking system 22 (via brake controller 13) in order to limit vehicle speed to a value corresponding to that of a HDC set-speed parameter HDC_set-speed which may be set by a user. The HDC set-speed may also be referred to as an HDC target speed. Provided the user does not override the HDC system by depressing the accelerator pedal when the HDC system 12HD is active, the HDC system 12HD controls the braking system 22 to prevent vehicle speed from exceeding the value of HDC_set-speed. In the present embodiment the HDC system 12HD is not operable to apply positive drive torque. Rather, the HDC system 12HD is only operable to apply negative brake torque by means of the braking system 22.

A HDC system HMI 20HD is provided by means of which a user may control the HDC system 12HD, including setting the value of HDC_set-speed. An HDC system selector button 177 is provided on the steering wheel 171 by means of which a user may activate the HDC system 12HD to control vehicle speed.

As noted above, the HDC system 12HD is operable to allow a user to set a value of HDC set-speed parameter HDC_set-speed and to adjust the value of HDC_set-speed using the same controls as the cruise control system 16 and LSP control system 12. Thus, in the present embodiment, when the HDC system 12HD is controlling vehicle speed, the HDC system set-speed may be increased, decreased or set to an instant speed of the vehicle in a similar manner to the set-speed of the cruise control system 16 and LSP control system 12, using the same control buttons 173, 173R, 174, 175. The HDC system 12HD is operable to allow the value of HDC_set-speed to be set to any value in the range from 2-30 kph.

If the HDC system 12HD is selected when the vehicle 100 is travelling at a speed of 50 kph or less and no other speed control system is in operation, the HDC system 12HD sets the value of HDC_set-speed to a value selected from a look-up table. The value output by the look-up table is determined in dependence on the identity of the currently selected transmission gear, the currently selected PTU gear ratio (Hi/LO) and the currently selected driving mode. The HDC system 12HD then applies the powertrain 129 and/or braking system 22 to slow the vehicle 100 to the HDC system set-speed provided the driver does not override the HDC system 12HD by depressing the accelerator pedal 161. The HDC system 12HD is configured to slow the vehicle 100 to the set-speed value at a deceleration rate not exceeding a maximum allowable rate although as noted elsewhere the HDC system 12HD is not able to cause positive drive torque to be applied by the powertrain 129 in order to reduce a rate of deceleration of the vehicle 100. The maximum allowable rate of deceleration is set at 1.25 ms-2 in the present embodiment, however other values may be useful in some embodiments. If the user subsequently presses the 'set-speed' button 173 the HDC system 12HD sets the value of HDC_set-speed to the instant vehicle speed provided the instant speed is 30 kph or less. If the HDC system 12HD is selected when the vehicle 100 is travelling at a speed exceeding 50 kph, the HDC system 12HD ignores the request and provides an indication to the user that the request has been ignored.

It is to be understood that the VCU 10 is configured to implement a Terrain Response (TR)™ System of the kind described above in which the VCU 10 controls settings of one or more vehicle systems or sub-systems such as the powertrain controller 11 in dependence on a selected driving mode. The driving mode may be selected by a user by means of a driving mode selector 141S (FIG. 1). The driving modes may also be referred to as terrain modes, terrain response modes, or control modes. In the embodiment of FIG. 1 four driving modes are provided: an 'on-highway' driving mode or 'special programs off' (SPO) mode suitable for driving on a relatively hard, smooth driving surface where a relatively high surface coefficient of friction exists between the driving surface and wheels of the vehicle; a 'sand' driving mode (SAND) suitable for driving over sandy terrain; a 'grass, gravel or snow' (GGS) driving mode suitable for driving over grass, gravel or snow, a 'rock crawl' (RC) driving mode suitable for driving slowly over a rocky surface; and a 'mud and ruts' (MR) driving mode suitable for driving in muddy, rutted terrain. Other driving modes may be provided in addition or instead.

In the present embodiment, at any given moment in time the LSP control system 12 is in one of a plurality of allowable 'on' modes (also referred to as conditions or states) selected from amongst an active or full function (FF) mode, a descent control (DC) mode, also referred to as an intermediate mode and a standby mode. The LSP control system may also assume an 'off' mode or condition. The active mode, DC mode and standby mode may be considered to be different 'on' modes or conditions of the vehicle, i.e. different modes in which the LSP control system is in an 'on' mode or condition as opposed to an 'off' mode or condition. In the off condition the LSP control system 12 only responds to pressing of the LSP selector button 172, which causes the LSP control system 12 to assume the on condition and the DC mode. When the LSP control system 12 assumes the on mode from the off mode in response to pressing of the LSP selector button, the value of user_set-speed is set to the instant speed of the vehicle 100 provided it is in the allowable range of speeds for operation of the LSP control system 12. If the vehicle speed 100 is above the allowable range of speeds for operation of the LSP control system 12, the value of user_set-speed is set to the highest allowable speed for operation of the LSP control system 12, i.e. 30 kph. The system 12 then sets the value of LSP_set-speed equal to user_set-speed provided a lower value of LSP_set-speed is not required as discussed below with respect to FIG. 5.

In the active or full function mode, the LSP control system 12 actively manages vehicle speed in accordance with the value of LSP_set-speed, by causing the application of positive powertrain drive torque to one or more driving wheels or negative braking system torque to one or more braked wheels.

In the DC mode the LSP control system 12 operates in a similar manner to that in which it operates when in the active mode except that the LSP control system 12 is prevented from commanding the application of positive drive torque by means of the powertrain 129. Rather, only braking torque may be applied, by means of the braking system 22 and/or powertrain 129. The LSP control system 12 is configured to increase or decrease the amount of brake torque applied to one or more wheels in order to cause the vehicle to maintain a speed substantially equal to LSP_set-speed to the extent possible without application of positive drive torque. It is to be understood that, in the present embodiment, operation of the LSP control system 12 in the DC mode is very similar to operation of the HDC system 12HD, except that the LSP control system 12 continues to employ the LSP control system 12 set-speed value LSP_set-speed rather than the HDC control system set-speed value HDC_set-speed.

In the standby mode, the LSP control system 12 is unable to cause application of positive drive torque or negative brake torque to a wheel.

As noted above, in the 'off' mode the LSP control system 12 is not responsive to any LSP input controls except the LSP control system selector button 172. Pressing of the LSP control system selector button 172 when the system 12 is in the off mode causes the system 12 to assume the 'on' condition and the DC mode.

When the LSP control system 12 is initially switched on by means of the LSP selector button 172, the LSP control system 12 assumes the DC mode.

If whilst in DC mode the 'set +' button 174 is pressed, the LSP control system 12 sets the value of user_set-speed to the instant value of vehicle speed according to vehicle speed signal 36 (FIG. 9, discussed in more detail below) and assumes the active mode. If the vehicle speed is above 30 kph, being the maximum allowable value of user_set-speed and LSP_set-speed, the LSP control system 12 remains in the DC mode and ignores the request to assume the active mode. A signal may be provided to the driver indicating that the LSP control system 12 cannot be activated due to the vehicle speed exceeding the maximum allowable value of LSP_set-speed. The signal may be provided by means of a text message provided on the LSP control HMI 18, by means of an indicator lamp, an audible alert or any other suitable means.

If the resume button 173R is depressed whilst in the DC mode, the LSP control system assumes the active mode and causes the vehicle to operate in accordance with the stored value of user_set-speed, i.e. LSP_set-speed is set to the stored value of user_set-speed unless a lower value of LSP_set-speed is required, provided the vehicle speed does not exceed 30 kph. The manner in which lower values of LSP_set-speed may be set is discussed in more detail below with respect to FIG. 5.

If vehicle speed is above 30 kph but less than or substantially equal to 50 kph when the resume button 173R is pressed the LSP control system 12 remains in the DC mode until vehicle speed falls below 30 kph. In the DC mode, provided the driver does not depress the accelerator pedal 161 the LSP control system 12 deploys the braking system 22 to slow the vehicle 100 to a speed substantially equal to the value of parameter LSP_set-speed. Once the vehicle speed falls to 30 kph or below, the LSP control system 12 assumes the active mode in which it is operable to cause a required amount of positive powertrain drive torque to be applied to one or more wheels via the powertrain 129, as well as negative torque via the powertrain 129 (via engine braking) and brake torque via the braking system 22 in order to control the vehicle in accordance with the LSP_set-speed value. The LSP control system 12 may generate a virtual accelerator pedal signal in order to cause the powertrain 129 to develop a required amount of powertrain torque in some embodiments. The virtual accelerator pedal signal may correspond to that which would be generated by an accelerator pedal controller in response to depression of the accelerator pedal 161 by an amount corresponding to the amount of powertrain torque required at a given moment in time. The accelerator pedal controller may form part of a powertrain controller 11 although other arrangements are also useful.

With the LSP control system 12 in the active mode, the user may increase or decrease the value of user_set-speed by means of the '+' and '−' buttons 174, 175. In addition, the user may optionally also increase or decrease the value of user_set-speed by lightly pressing the accelerator or brake pedals 161, 163 respectively. In some embodiments, with the LSP control system 12 in the active mode the '+' and '−' buttons 174, 175 may be disabled such that adjustment of the value of user_set-speed can only be made by means of the accelerator and brake pedals 161, 163. This latter feature may prevent unintentional changes in set-speed from occurring, for example due to accidental pressing of one of the '+' or '−' buttons 174, 175. Accidental pressing may occur for example when negotiating difficult terrain where relatively large and frequent changes in steering angle may be required. Other arrangements are also useful.

It is to be understood that in the present embodiment the LSP control system 12 is operable to cause the vehicle to travel in accordance with a value of LSP_set-speed in the range from 2-30 kph whilst the cruise control system is operable to cause the vehicle to travel in accordance with a value of set-speed in the range from 25-150 kph although other values are also useful, such as 30-120 kph or any other suitable range of values.

It is to be understood that if the LSP control system 12 is in the active mode, operation of the cruise control system 16 is inhibited. The two speed control systems 12, 16 therefore operate independently of one another, so that only one can be operable at any one time.

In some embodiments, the cruise control HMI 18 and the LSP control HMI 20 may be configured within the same hardware so that, for example, the speed selection is input via the same hardware, with one or more separate switches being provided to switch between the LSP control HMI 20 and the cruise control HMI 18.

When in the active mode, the LSP control system 12 is configured to command application of positive powertrain torque and negative brake torque, as required, by transmitting a request for (positive) drive torque in the form of a powertrain torque signal and/or a request for (negative) brake torque in the form of a brake torque signal to the brake controller 13. The brake controller 13 arbitrates any demand for positive powertrain torque, determining whether the request for positive powertrain torque is allowable. If a request for positive powertrain torque is allowable the brake controller 13 issues the request to the powertrain controller 11. In some embodiments, the request for brake torque may correspond to an amount of brake torque (or brake fluid pressure) to be developed by the braking system 22. In some alternative embodiments the request for brake torque may be for an amount of negative torque to be applied to one or more wheels. The brake controller 13 may in some embodiments determine whether the requested negative torque is to be supplied by means of powertrain braking alone, for example engine overrun braking, by means of powertrain braking and brake torque developed by the braking system 22, or by means of the braking system 22 alone. In some embodiments the brake controller 13 or LSP control system 12 may be configured to cause a required amount of net negative torque to be applied to one or more wheels by applying negative torque by means of the braking system 22 against positive drive torque generated by the powertrain 129. Application of positive drive torque generated by means of the powertrain 129 against negative brake torque generated by means of the braking system 22 may be made in order to reduce wheel flare when driving on surfaces of relatively low surface coefficient of friction such as during off-road driving. By wheel flare is meant excessive wheel slip as a result of the application of excess positive net torque to a wheel.

The sensors on the vehicle 100 include sensors which provide continuous sensor outputs to the VCU 10, including wheel speed sensors, as mentioned previously and as shown in FIG. 1, and other sensors (not shown) such as an ambient temperature sensor, an atmospheric pressure sensor, tyre pressure sensors, wheel articulation sensors, gyroscopic sensors to detect vehicular yaw, roll and pitch angle and rate, a vehicle speed sensor, a longitudinal acceleration sensor, an engine torque sensor (or engine torque estimator), a steering angle sensor, a steering wheel speed sensor, a gradient sensor (or gradient estimator), a lateral acceleration sensor which may be part of the SCS 14S, a brake pedal position sensor, a brake pressure sensor, an accelerator pedal position sensor, longitudinal, lateral and vertical motion sensors, and water detection sensors forming part of a vehicle wading assistance system (not shown). In other embodiments, only a selection of the aforementioned sensors may be used. Other sensors may be useful in addition or instead in some embodiments.

The VCU 10 also receives a signal from the steering controller 170C. The steering controller 170C is in the form of an electronic power assisted steering unit (ePAS unit). The steering controller 170C provides a signal to the VCU 10 indicative of the steering force being applied to steerable road wheels 111, 112 of the vehicle 100. This force corresponds to that applied by a user to the steering wheel 171 in combination with steering force generated by the ePAS unit 170C.

The VCU 10 evaluates the various sensor inputs to determine the probability that each of a plurality of different control modes (driving modes) for the vehicle subsystems is appropriate, with each control mode corresponding to a particular terrain type over which the vehicle is travelling (for example, mud and ruts, sand, grass/gravel/snow).

If the user has selected operation of the vehicle in an automatic driving mode selection condition, the VCU 10 then selects the most appropriate one of the control modes and is configured automatically to control the subsystems according to the selected mode. This aspect of the invention is described in further detail in our co-pending patent application nos. GB2492748, GB2492655 and GB2499252, the contents of each of which is incorporated herein by reference.

The nature of the terrain over which the vehicle is travelling (as determined by reference to the selected control mode) is utilised by the LSP control system 12 to determine an appropriate increase or decrease in vehicle speed. For example, if the user selects a value of user_set-speed that is not suitable for the nature of the terrain over which the vehicle is travelling, the system 12 is operable to automatically adjust the vehicle speed downwards by reducing the value of LSP_set-speed. In some cases, for example, the user selected speed may not be achievable or appropriate over certain terrain types, particularly in the case of uneven or rough surfaces. If the system 12 selects automatically a value of LSP_set-speed that differs from the value of user_set-speed, a visual indication of the speed constraint is provided to the user via the LSP HMI 20 to indicate that an alternative speed has been adopted.

In the present embodiment, the LSP control system 12 is configured to determine the speed at which the vehicle 100 is to be caused to operate at a given moment in time, LSP_set-speed, in dependence on the value of user_set-speed and a maximum speed steering_angle_v that is set in dependence on steering angle, steering_angle, and selected driving mode, driving_mode, as described in more detail below.

Figure 5:
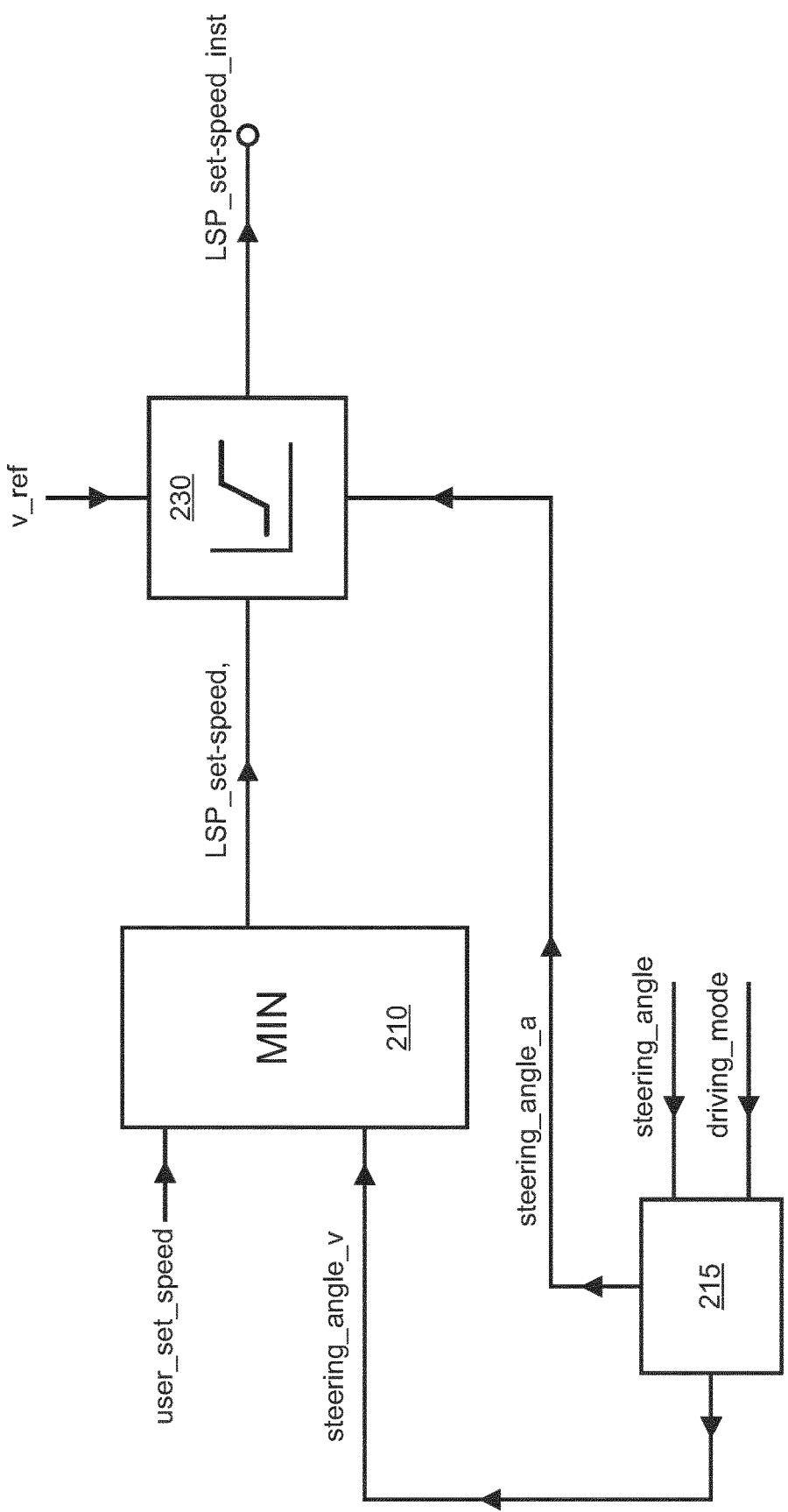
FIG. 5 is a schematic illustration of a portion of a control system of the vehicle of FIG. 1.

FIG. 5 illustrates a corresponding portion of the LSP control system 12. As shown in FIG. 5, the parameters user_set-speed and steering_angle_v are input to a minimiser function block 210 of the system 12. The minimiser function block 210 outputs to a rate limiter function block 230 a value of a parameter LSP_set-speed. Parameter LSP_set-speed is set to the lower of the two parameters user_set-speed and steering_angle_v.

The value of steering_angle_v is determined by a function block 215 that receives as inputs the value of parameters steering_angle and driving_mode. Parameter steering_angle is indicative of an angle through which a steering wheel 171 has been turned relative to a position of the steering wheel 171 corresponding to travel in a substantially straight line. Parameter driving_mode is indicative of the currently selected vehicle driving mode such as SPO, GGS, SAND, MR or RC. In some embodiments one or more other parameters may be input to function block 215 in addition or instead.

The value of steering_angle_v is determined by steering angle function block 215 by reference to one or more look-up tables which contain values of steering_angle_v as a function of steering_angle and driving_mode. It is to be understood that in some alternative embodiments the value of steering_angle_v may be determined at least in part as a function of vehicle lateral acceleration, for example based on a parameter yaw_rate indicative of vehicle yaw rate and vehicle ground speed, in addition to parameter driving_mode. Vehicle ground speed is given by a vehicle reference speed parameter v_ref that is fed to the LSP control system 12. In some embodiments a parameter indicative of rate of change of steering_angle, steering_angle_rate, may be used to determine steering_angle_v in addition to or instead of parameter steering_angle. Parameter steering_angle_rate may be determined as the time derivative of parameter steering_angle, or by means of a separate sensor.

The one or more look-up tables also store data indicative of an acceleration profile and a deceleration profile associated with control of vehicle speed for use by the LSP control system 12 when a difference (or 'delta') exists between the instant vehicle speed (vehicle reference speed, v_ref) and the value of LSP_set-speed. In the present embodiment, the data indicative of acceleration profile and deceleration profile is in the form of a parameter steering_angle_a indicative of the identity of the acceleration profile or deceleration profile that is to be employed at a given moment in time, the values of parameter steering_angle_a being stored as a function of steering_angle and driving_mode. The steering angle function block 215 outputs the value of vehicle acceleration rate parameter steering_angle_a to a rate limiter function block 230 which controls vehicle rate of acceleration (and deceleration) as described in further detail below.

As noted above, the rate limiter function block 230 receives as inputs the value of parameter LSP_set-speed and acceleration rate parameter steering_angle_a. The rate limiter function block 230 also receives the value of the vehicle reference speed v_ref corresponding to the instant vehicle speed. The rate limiter function block 230 outputs a value of parameter LSP_set-speed_inst to a portion of the LSP control system 12 responsible for direct control of vehicle speed. This portion of the powertrain is configured substantially continuously to attempt to maintain vehicle reference speed v_ref substantially equal to LSP_set-speed_inst as described below with reference to FIG. 9.

The rate limiter function block 230 attempts to cause v_ref to become equal to LSP_set-speed at a rate determined in dependence on the value of steering_angle_a. The rate limiter function block 230 accomplishes this by selecting a predetermined acceleration rate profile from a look-up table, the selected profile depending on the value of steering_angle_a (which in turn depends on steering_angle and driving mode as discussed above), and causes the value of parameter LSP_set-speed_inst to transition iteratively towards the value of LSP_set-speed at a rate determined according to the selected predetermined acceleration profile. By controlling the rate of change of parameter LSP_set-speed_inst, the rate of change of v_ref may therefore be controlled.

In the present embodiment, the rate limiter function block 230 stores acceleration profiles corresponding to positive values of vehicle acceleration (employed when v_ref is less than LSP_set-speed and an increase in v_ref is required) and acceleration profiles corresponding to negative values of vehicle acceleration (employed when v_ref is greater than LSP_set-speed and a decrease in v_ref is required). This is because in certain terrain conditions it is desirable to have positive acceleration profiles that demand higher rates of acceleration than the corresponding negative acceleration profiles, and vice-versa. For example, when driving on sandy terrain and an increase in vehicle speed is required, it is typically desirable to accelerate at a relatively high rate of acceleration, whilst when a decrease in vehicle speed is required it is typically desirable to decelerate at a relatively low rate in order to reduce a risk of sink of one or more wheels into the driving surface. Sink of one or more wheels into the driving surface may result from skid associated with excessive braking on deformable surfaces such as sand. The LSP control system 12 is configured to take these factors into account by selecting a suitable acceleration profile according to the value of steering_angle_a. It will be appreciated that alternatively a single common profile can be used for acceleration and deceleration.

Figure 6:
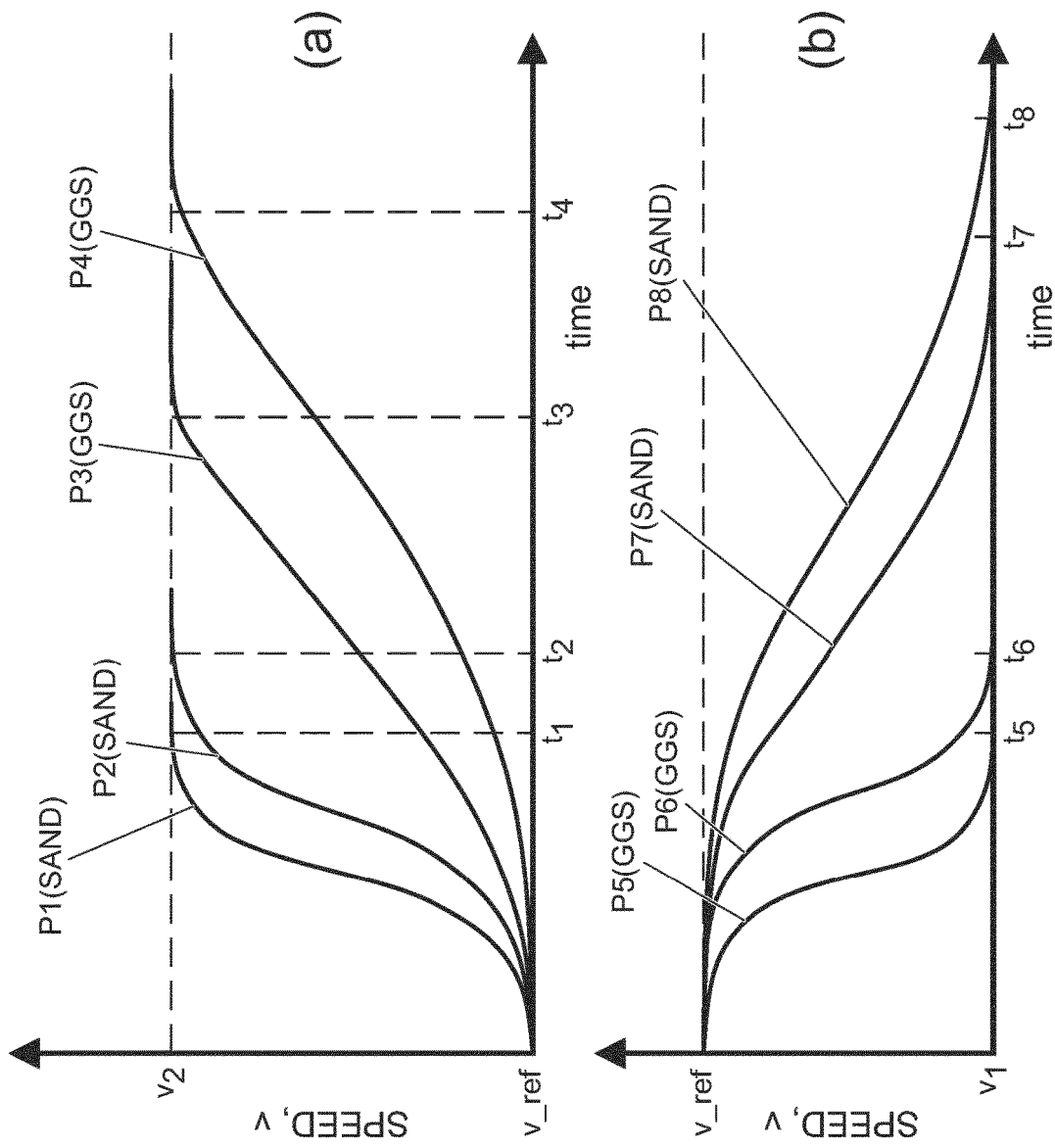
FIG. 6 shows (a) exemplary speed profiles for use when an increase in speed is required and (b) exemplary speed profiles for use when a decrease in speed is required.

FIG. 6 illustrates schematically examples of acceleration profiles stored by the rate limiter function block 210 for use when positive acceleration is required (FIG. 6(a)) and when negative acceleration is required (FIG. 6(b)) for two different driving modes, GGS mode and SAND mode, in one embodiment.

Profile P1(SAND) of FIG. 6(a) is an exemplary profile used when the VCU 10 is operating in the SAND mode and it is required to accelerate the vehicle 100 from a current (instant) speed v_ref to a speed v2 after a decrease in the value of LSP_set-speed has occurred due to cornering, and the steering wheel 171 has been returned to the straight-ahead condition. It is to be understood that v2 will correspond to the value of LSP_set-speed output by minimiser function block 210, and the value of LSP_set-speed_inst will be increased in an iterative manner towards LSP_set-speed in a manner such that the increase in vehicle speed follows the profile P1(SAND).

Profile P2(SAND) is a corresponding exemplary profile that is employed when the value of LSP_set-speed has increased due to a decrease in steering_angle but where the value of steering_angle is still non-zero. The actual value of v2 may be lower than that in the case of profile P1(SAND) due to the fact that steering_angle is still non-zero in the case of profile P2(SAND). Profile P2(SAND) corresponds to more gentle acceleration than profile P1(SAND) because the value of steering_angle is still non-zero.

Profile P3(GGS) is an exemplary profile used when the VCU 10 is operating in the GGS mode and it is required to accelerate the vehicle 100 from a current (instant) speed v_ref to a speed v2 following a decrease in the value of LSP_set-speed due to cornering and the steering wheel 171 has been returned to the straight-ahead condition. It is to be understood that v2 will correspond to the value of LSP_set-speed, and the value of LSP_set-speed_inst will be increased in an iterative manner towards LSP_set-speed in a manner such that the increase in vehicle speed follows the profile P3(GGS).

Profile P4(GGS) is a corresponding exemplary profile that is employed when the VCU 10 is in the GGS mode and the value of LSP_set-speed has increased due to a decrease in steering_angle but where the value of steering_angle is still non-zero. The actual value of v2 may be lower than that in the case of profile P3(GGS) due to the fact that steering_angle is still non-zero. In a similar manner to profiles P1 and P2, profile P4 corresponds to more gentle acceleration than profile P3 because the value of steering_angle is still non-zero.

Profile P5(GGS) of FIG. 6(b) is an exemplary profile used when the VCU 10 is operating in the GGS mode and it is required to decelerate the vehicle 100 from a current (instant) speed v_ref to a speed v1 lower than v_ref due to cornering. It is to be understood that v1 will correspond to the value of LSP_set-speed, and the value of LSP_set-speed_inst will be decreased in an iterative manner towards LSP_set-speed in a manner such that the decrease in vehicle speed follows the profile P5(GGS). Profile P5(GGS) corresponds to a relatively sharp decrease in vehicle speed, due to turning of the steering wheel 171 from a straight ahead condition (steering_angle substantially equal to zero) through a relatively large angle.

Profile P6(GGS) is a corresponding exemplary profile that is employed when the value of LSP_set-speed has decreased due to cornering, where the increase in steering_angle from the straight-ahead condition is less than in the case of profile P5(GGS). The actual value of LSP_set-speed (and therefore v1) may be higher in the case of profile P6(GGS) than in the case of profile P5(GGS) due to the fact that steering_angle is lower in the case of profile P6(GGS) compared with profile P5(GGS). It is to be understood that a greater rate of deceleration is employed for larger changes in steering_angle (such as in the case of profile P5) is due to an increased likelihood of skidding when turning on relatively slippery grass, gravel or snow surfaces.

Profile P7(SAND) of FIG. 6(b) is an exemplary profile used when the VCU 10 is operating in the SAND mode and it is required to decelerate the vehicle 100 from a current (instant) speed v_ref to a speed v1 lower than v_ref due to cornering. It is to be understood that v1 will correspond to the value of LSP_set-speed, and the value of LSP_set-speed will be decreased in an iterative manner towards LSP_set-speed_inst in a manner such that the decrease in vehicle speed follows the profile P7(SAND). Profile P7(SAND) is the profile used when the VCU 10 is in the SAND mode and the steering wheel 171 is turned from a straight ahead condition to a relatively large value similar to the value in the case of profile P5(GGS). It can be seen that more gentle deceleration is effected in the case of operation in the SAND mode compared with the GGS mode, in order to prevent (or reduce) sink of the vehicle 100 into the driving surface.

Profile P8(SAND) is a corresponding exemplary profile that is employed when the VCU is in the SAND mode and the value of LSP_set-speed has decreased due to cornering, where the change in steering_angle from the straight-ahead condition is less than in the case of profile P7(SAND) and similar to that in the case of profile P6(GGS). The actual value of LSP_set-speed (and therefore v1) may be higher in the case of profile P8(SAND) than in the case of profile P7(SAND) due to the fact that steering_angle is lower in the case of profile P8(SAND) compared with profile P7(SAND).

Figure 7:
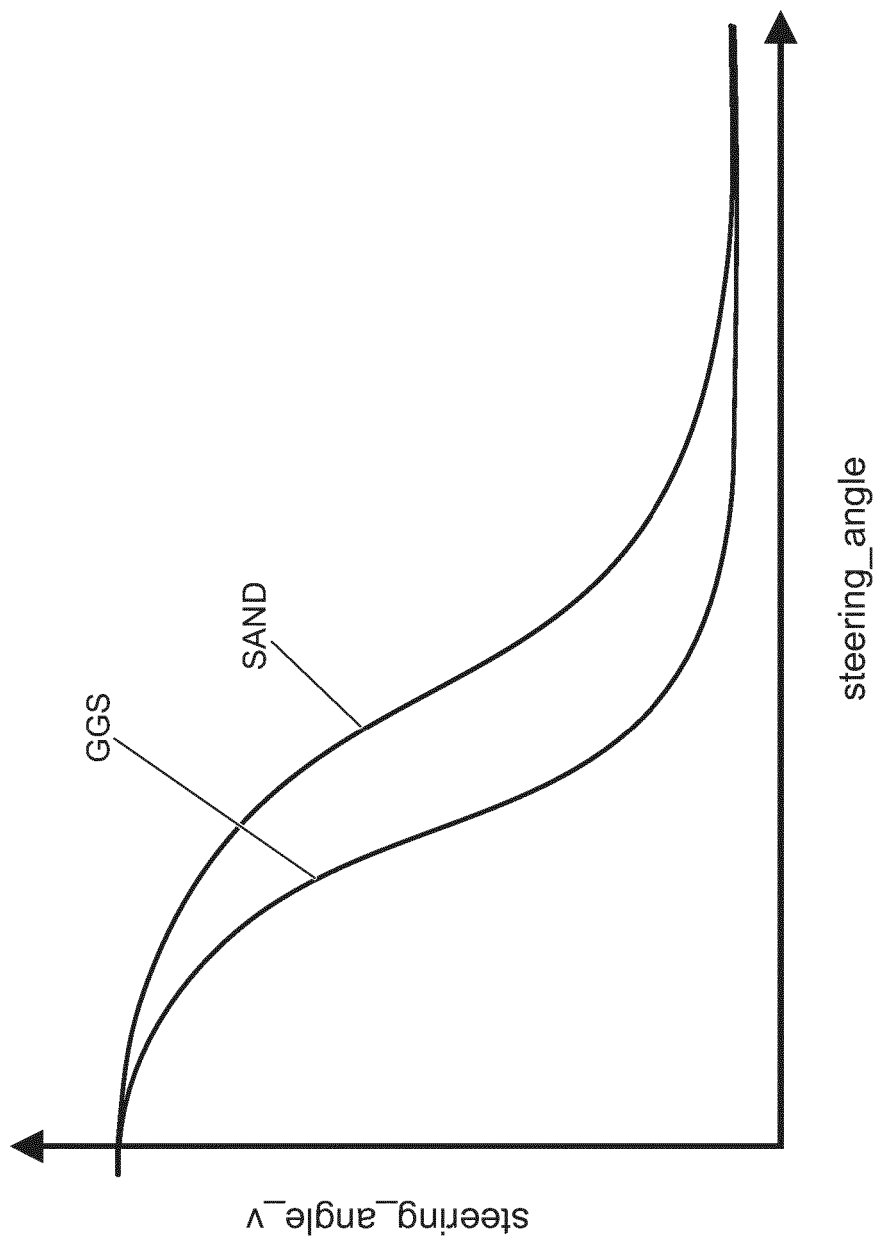
FIG. 7 shows an exemplary plot of maximum allowable vehicle speed as a function of steering angle when an automatic speed control system is in operation for two different terrain response modes.

FIG. 7 is a plot of steering_angle_v as a function of steering_angle for two different driving modes, GGS and SAND. It can be seen that steering_angle_v decreases as a function of steering_angle in both cases according to an S-curve, the rate of decrease of steering_angle_v as a function of steering_angle being greater in the GGS mode compared with the SAND mode. The more aggressive reduction in steering_angle_v as a function of increasing steering_angle in the case of operation in the GGS mode is due at least in part to the greater risk of loss of traction of the vehicle 100 when operating on grass, gravel or snow terrain. In contrast, when operating on sand, wheel slip is expected due to the fluid like behaviour of the surface of sand. Greater amounts of wheel slip may be acceptable when operating on sand since surface degradation due to wheel slip is typically less problematic than in the case of more fragile surfaces such as grass.

It is to be understood that in some embodiments the LSP control system 12 may be configured to take into account factors other than turning of a vehicle in determining the value of LSP_set-speed, in addition to turning information such as steering angle. In one alternative embodiment the LSP control system 12 is configured to set the value of LSP_set-speed to the lower of six values of set-speed.

Figure 8:
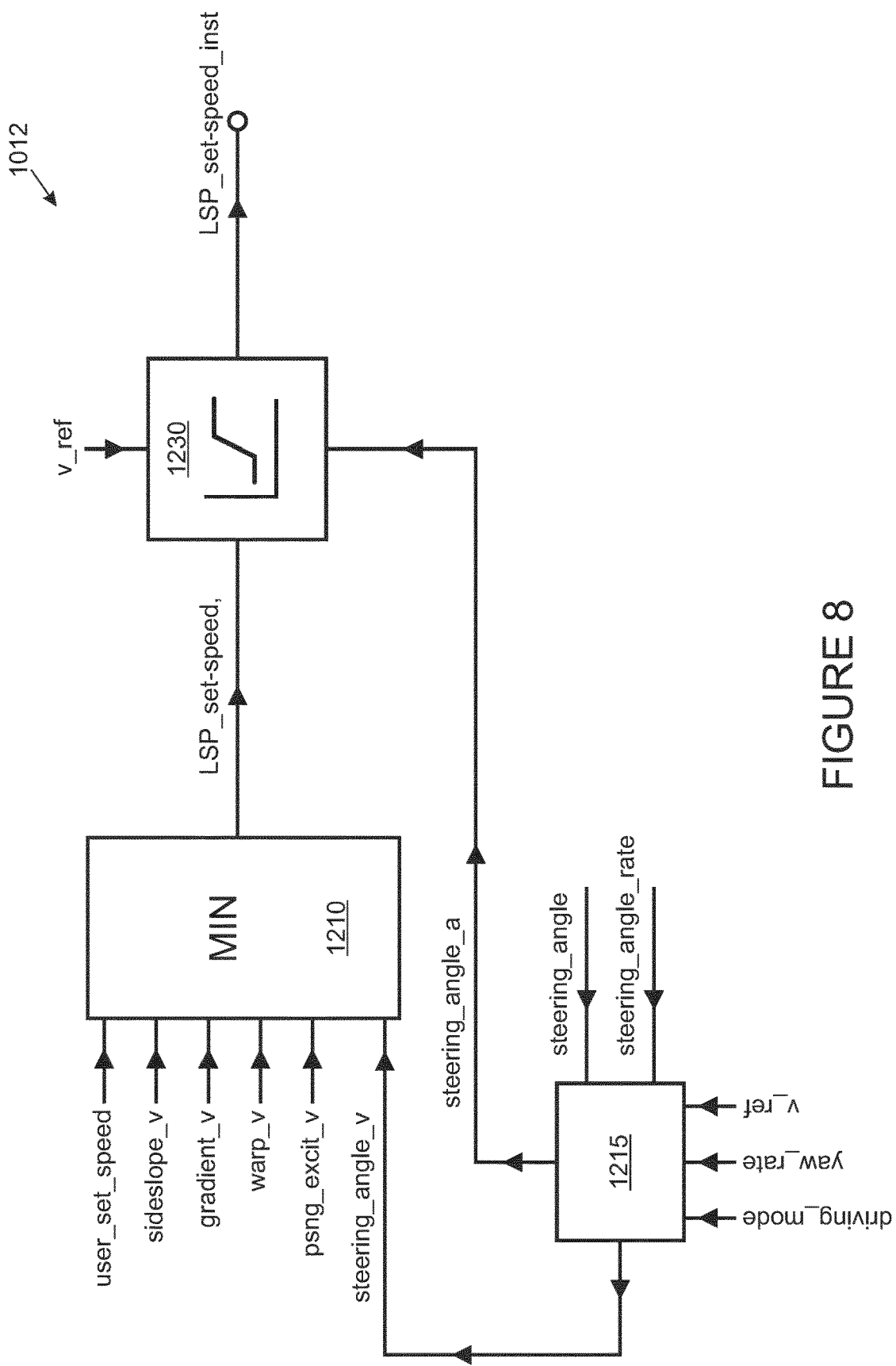
FIG. 8 is a schematic illustration of a portion of a control system of a vehicle according to a further embodiment of the present invention.

FIG. 8 is a schematic illustration of a portion of an LSP control system 1012 according to this alternative embodiment and shows features corresponding to those of FIG. 5. It is to be understood that corresponding features of the embodiment of FIG. 8 to those of the embodiment of FIG.'s 1 to 7 are shown with like reference signs incremented by 1000.

In the embodiment of FIG. 8, minimiser function block 1210 is configured to receive six values of set-speed and to set the value of LSP_set-speed output thereby to the lower of the six values received. The six speed values are (a) the value of target speed requested by a user, user_set-speed, described above; (b) a maximum vehicle speed psng_excit_v calculated in dependence on the value of an occupant excitation parameter psng_excit, the value of psng_excit being set in dependence on vehicle pitch acceleration, roll acceleration and heave acceleration; (c) a maximum speed sideslope_v that is set in dependence on a value of surface side slope; (d) a maximum speed gradient_v that is set in dependence on surface gradient; (e) a maximum speed warp_v or warp speed that is set in dependence on vehicle suspension articulation, also referred to as suspension warp, and (f) a maximum speed steering_angle_v that is set in dependence on steering angle, rate of change of steering angle (steering_angle_rate) and selected driving mode, driving mode as described in more detail below. Optionally, the LSP control system may take into account one or more further maximum speed values, which may include a maximum speed value that is set in dependence on whether the vehicle is wading. In some embodiments this maximum speed value may be set in dependence at least in part on a depth of liquid through which the vehicle is wading. Other parameters are also useful. Other speed values may also be useful. Means by which calculation of parameters (a) to (e) above may be made is also discussed in co-pending international patent application WO2014/027069, the content of which is hereby incorporated by reference.

In the embodiment of FIG. 8 the value of steering_angle_v is determined by steering angle function block 1215 that receives as inputs the value of parameters steering_angle, steering_angle_rate, driving_mode, yaw_rate and vehicle reference speed v_ref. As described above with respect to the embodiment of FIG. 5, parameter steering_angle is indicative of an angle through which a steering wheel 171 has been turned relative to a position of the steering wheel 171 corresponding to travel in a substantially straight line. Parameter steering_angle_rate is indicative of a rate of turn of the steering wheel 171 whilst parameter driving_mode is indicative of the currently selected vehicle driving mode such as SPO, GGS, SAND, MR or RC. Parameter yaw_rate is indicative of an instant rate of yaw of the vehicle 100 whilst parameter v_ref corresponds to an instant speed of travel of the vehicle 100.

The value of steering_angle_v is determined by steering angle function block 1215 by reference to a look-up table which contains values of steering_angle_v as a function of vehicle lateral acceleration (calculated based on the product of yaw_rate and v_ref), steering_angle, steering_angle_rate and driving_mode. It is to be understood that in the present embodiment the value of steering_angle_v is configured to decrease as a function of increasing values of steering_angle and steering_angle_rate. The function block 1215 also reduces steering_angle_v in dependence on the value of yaw_rate and v_ref, independently of the value of steering_angle and steering_angle_rate.

It is to be understood that by taking into account steering_angle and yaw_rate independently of one another, the LSP control system 1012 is able to cause a reduction in LSP_set-speed in the case that (a) a driver turns the steering wheel of the vehicle whilst travelling over a relatively slippery surface, and wheel skid prevents turning of the vehicle (i.e., parameter yaw_rate does not correspond to that expected for the instant value of steering_angle), and (b) a driver does not turn the steering wheel but yaw of the vehicle 100 occurs for another reason such as inadvertent skidding when driving over a relatively slippery surface.

In some embodiments, the steering angle function block 1215 may be configured to detect skid by determining an expected value of parameter yaw_rate for the prevailing value of parameter steering_angle. The steering angle function block 1215 may adjust the value of steering_angle_v in dependence on the difference (i.e. the error) between actual and expected yaw rate for the prevailing steering angle. Other arrangements are also useful.

The steering angle function block 1215 outputs the value of steering_angle_v to the minimiser function block 1210, which in turn outputs the lower of the values of set-speed input thereto as parameter LSP_set-speed to rate limiter function block 1230.

The steering angle function block 1215 also outputs the value of a parameter steering_angle_a to rate limiter function block 1230. The value of parameter steering_angle_a is determined in dependence on parameter steering_angle and driving_mode in a similar manner to the embodiment of FIG. 5.

Rate limiter function block 1230 operates in a similar manner to the rate limiter function block 230 described with respect to the embodiment of FIG. 5, and outputs a value of parameter LSP_set-speed_inst.

As noted above, FIG. 9 illustrates schematically a portion of the LSP control system and vehicle 12 responsible for maintaining vehicle speed v_ref substantially equal to LSP_set-speed_inst.

Figure 9:
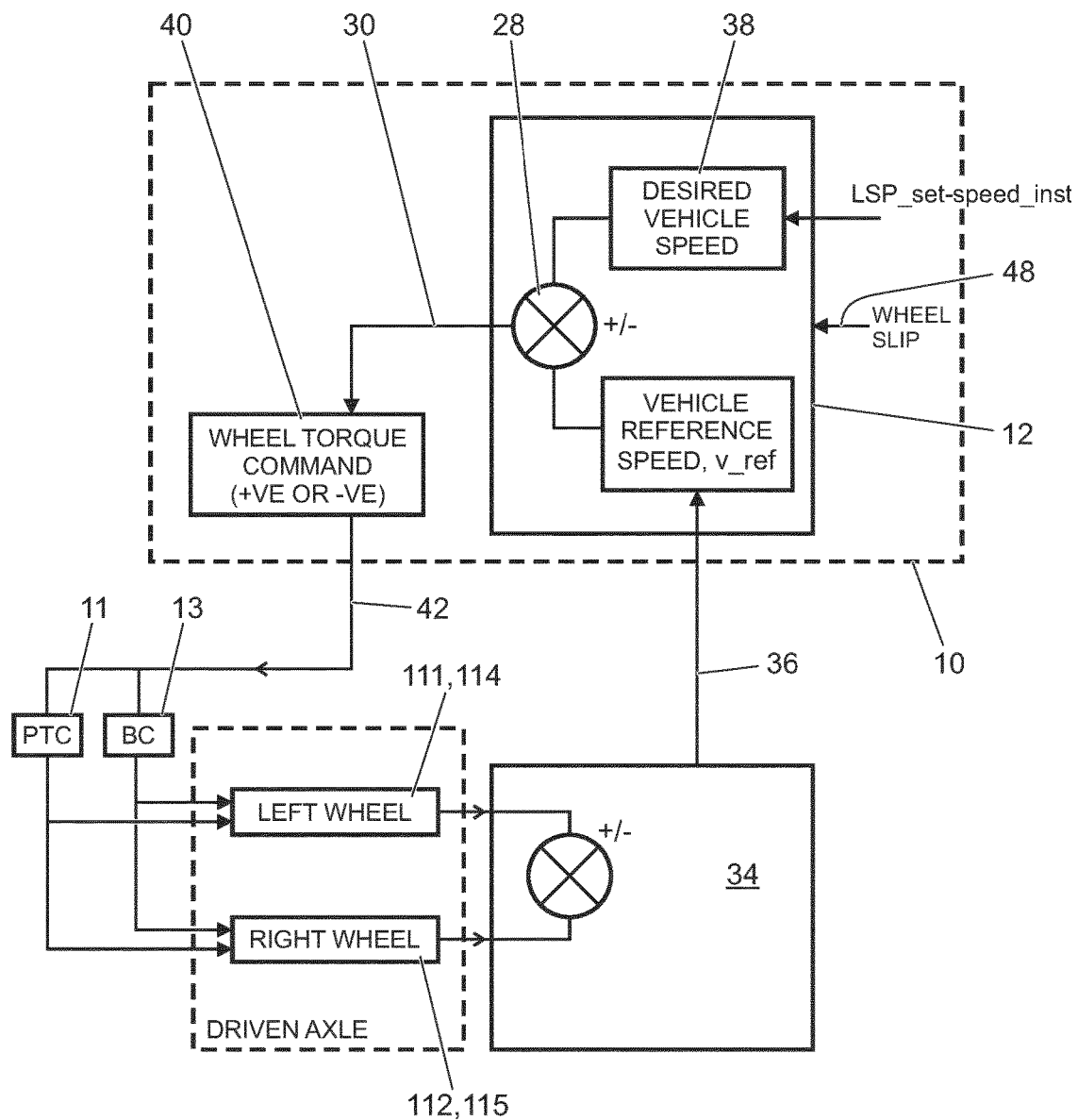
FIG. 9 is a schematic diagram of further features of the vehicle speed control system of FIG. 3.

As shown in FIG. 9, a vehicle speed calculator 34 provides a vehicle reference speed signal 36 (v_ref) indicative of vehicle speed to the LSP control system 12. The speed calculator 34 determines vehicle speed based on wheel speed signals provided by wheel speed sensors 111S, 112S, 114S, 115S. The LSP control system 12 includes a comparator 28 which compares the value of parameter LSP_set-speed_inst 38 (also referred to as an instant value of target speed 38) with the measured vehicle reference speed 36 and provides an output signal 30 indicative of the comparison. The output signal 30 is provided to an evaluator unit 40 of the VCU 10 which interprets the output signal 30 as either a demand for additional torque to be applied to the vehicle wheels 111-115, or for a reduction in torque applied to the vehicle wheels 111-115, depending on whether the vehicle speed needs to be increased or decreased to maintain a vehicle speed substantially equal to LSP_set-speed_inst. An increase in torque is generally accomplished by increasing the amount of powertrain torque delivered to a given position of the powertrain 129, for example an engine output shaft, a wheel or any other suitable location. A decrease in torque at a given wheel to a value that is less positive or more negative may be accomplished by decreasing the amount of any positive powertrain torque delivered to a wheel, by increasing the amount of any negative powertrain torque delivered to a wheel, for example by reducing an amount of air and/or fuel supplied to an engine 121, and/or by increasing a braking force on a wheel. It is to be understood that in some embodiments in which a powertrain 129 has one or more electric machines operable as a generator, negative torque may be applied by the powertrain 129 to one or more wheels by means of the electric machine. As noted above negative torque may also be applied by means of engine braking in some circumstances, depending at least in part on the speed at which the vehicle 100 is moving. If one or more electric machines are provided that are operable as propulsion motors, positive drive torque may be applied by means of the one or more electric machines.

An output 42 from the evaluator unit 40 is provided to the brake controller 13. The brake controller 13 in turn controls a net torque applied to the vehicle wheels 111-115 by commanding application of brake torque via the brakes 111B, 112B, 114B, 115B and/or positive or negative powertrain drive torque by commanding powertrain controller 11 to deliver a required amount of powertrain torque. The net torque may be increased or decreased depending on whether the evaluator unit 40 demands positive or negative torque. In some alternative embodiments a signal may be provided directly to the powertrain controller 11 from the evaluator unit 40, rather than via the brake controller 13 as in the present embodiment.

In order to cause application of the necessary positive or negative torque to the wheels, the brake controller 13 may command that positive or negative torque is applied to the vehicle wheels by the powertrain 129 and/or that a braking force is applied to the vehicle wheels by the braking system 22, either or both of which may be used to implement the change in torque that is necessary to attain and maintain a required vehicle speed. In the illustrated embodiment the torque is applied to the vehicle wheels individually so as to maintain the vehicle 100 at the required speed, but in another embodiment torque may be applied to the wheels collectively to maintain the required speed. In some embodiments, the powertrain controller 11 may be operable to control an amount of torque applied to one or more wheels at least in part by controlling a driveline component such as a rear drive unit, front drive unit, differential or any other suitable component. For example, one or more components of the driveline 130 may include one or more clutches operable to allow an amount of torque applied to wheels of a given axle to be controlled independently of the torque applied to wheels of another axle, and/or the amount of torque applied to one or more individual wheels to be controlled independently of other wheels. Other arrangements are also useful.

Where a powertrain 129 includes one or more electric machines, for example one or more propulsion motors and/or generators, the powertrain controller 11 may be operable to modulate or control the amount of torque applied to one or more wheels at least in part by means of the one or more electric machines.

The LSP control system 12 also receives a signal 48 indicative of a wheel slip event having occurred. This may be the same signal 48 that is supplied to the on-highway cruise control system 16 of the vehicle, and which in the case of the latter triggers an override or inhibit mode of operation of the on-highway cruise control system 16 so that automatic control of vehicle speed by the on-highway cruise control system 16 is suspended or cancelled. However, the LSP control system 12 is not arranged to cancel or suspend operation in dependence on receipt of a wheel slip signal 48 indicative of wheel slip. Rather, the system 12 is arranged to monitor and subsequently manage wheel slip so as to reduce driver workload. During a slip event, the LSP control system 12 continues to compare the measured vehicle speed v_ref with the value of LSP_set-speed, and continues to control automatically the torque applied to the vehicle wheels so as to maintain vehicle speed at the selected value. It is to be understood therefore that the LSP control system 12 is configured differently to the cruise control system 16, for which a wheel slip event has the effect of overriding the cruise control function so that manual operation of the vehicle 100 must be resumed, or speed control by the cruise control system 12 resumed by pressing the resume button 173R or set-speed button 173.

In a further embodiment of the present invention (not shown) a wheel slip signal 48 is derived not just from a comparison of wheel speeds, but further refined using sensor data indicative of the vehicle's speed over ground. Such a speed over ground determination may be made via global positioning (GPS) data, or via a vehicle mounted radar or laser based system arranged to determine the relative movement of the vehicle 100 and the ground over which it is travelling. A camera system may be employed for determining speed over ground in some embodiments.

At any stage of the LSP control process the user can override the LSP function by depressing the accelerator pedal 161 and/or brake pedal 163 to adjust the vehicle speed in a positive or negative sense. If the brake pedal 163 is depressed the LSP control system 12 terminates automatic control of vehicle speed. However, absent any override by a user, in the event that a wheel slip event is detected via signal 48, the LSP control system 12 remains active and control of vehicle speed by the LSP control system 12 is not terminated. As shown in FIG. 9, this may be implemented by providing a wheel slip event signal 48 to the LSP control system 12 which is then managed by the LSP control system 12 and/or brake controller 13. In the embodiment shown in FIG. 1 the SCS 14S generates the wheel slip event signal 48 and supplies it to the LSP control system 12 and cruise control system 16.

Some embodiments of the present invention have the advantage that vehicle composure may be enhanced relative to known vehicles by adjusting the speed of a vehicle 100 in dependence on information in respect of a turning condition of a vehicle 100 when under the control of an automatic speed control system. Furthermore, in some embodiments an acceleration profile followed by a speed control system when a reduction in speed is required due to turning condition information may also be controlled so as to enhance vehicle composure. In some embodiments, an acceleration profile followed when a reduction in speed due to turning information is no longer required may also be controlled such that an increase in vehicle speed occurs in a manner so as to preserve vehicle composure.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A speed control system for a vehicle, comprising:
an electric controller configured to automatically cause the vehicle to operate in accordance with a target speed value, the electric controller configured to receive electrical signals indicative of turning of a vehicle and a driving condition of the vehicle, and
configured to adjust automatically the value of the target speed value in dependence on both said electrical signal indicative of turning of a vehicle and said electrical signal indicative of a driving condition of the vehicle, wherein the electrical signal indicative of a driving condition of the vehicle comprises a signal relating to at least one of a driving mode in which a vehicle is operating and a driving surface over which a vehicle is driving.

2. The system according to claim 1, wherein adjusting automatically the value of the target speed value in dependence on said electrical signals comprises the electric controller being configured to generate a signal to automatically adjust the target speed value.

3. The system according to claim 1, wherein the electrical signal relating to turning of a vehicle includes information relating to steering angle and/or an amount of lateral acceleration of a vehicle.

4. The system according to claim 3, wherein the steering angle is one selected from among a steering wheel angle and a steerable road wheel angle.

5. The system according to claim 1, wherein the electrical signal indicative of a driving condition of the vehicle comprises a signal relating to a driving surface over which a vehicle is driving, wherein the system is configured to obtain the information relating to a driving surface by reference to at least one selected from among: one or more images captured by a camera device; a value of coefficient of friction, between a driving surface and vehicle wheel; vehicle pitch attitude; vehicle roll attitude; suspension articulation; driving surface roughness; movement of a body of a vehicle; and movement of a body of a vehicle occupant relative to a body of a vehicle.

6. The control system according to claim 1, comprising a user-operable driving mode control input for selecting a driving mode of a vehicle.

7. The control system according to claim 6, comprising an automatic driving mode selector controller configured to select automatically a driving mode appropriate to a driving surface over which a vehicle is driving when the system is operated in an automatic driving mode selection mode, the system further comprising a user-operable automatic driving mode control input for activating the automatic driving mode selection mode.

8. The control system according to claim 6, wherein a plurality of driving modes are provided, and the driving modes are control modes of at least one subsystem of a vehicle selected from among an engine management system, a transmission system, a steering system, a brakes system and a suspension system, the system comprising a subsystem controller for initiating control of the or each of the vehicle subsystems in the selected one of the plurality of subsystem control modes, each of the subsystem control modes corresponding to one or more different driving surfaces.

9. The control system according to claim 1, wherein the controller is configured to determine:
a turning maximum speed value in dependence at least in part on the signals indicative of turning of a vehicle and driving condition, and
at least one further maximum speed value,
the system being configured to cause the value of target speed to be set to the lower of the turning maximum speed value and the at least one further maximum speed value.

10. The system according to claim 9, wherein the at least one further maximum speed value includes a user defined speed value corresponding to a maximum speed at which the user wishes to travel.

11. The system according to claim 1, wherein the controller is configured to determine a maximum allowable rate of one or more of positive and negative acceleration of a vehicle in dependence at least in part on the signals indicative of turning of a vehicle and driving condition, the system being configured to limit the rate of said one or more of positive and negative acceleration according to the maximum allowable rate.

12. The system according to claim 1, wherein the controller is configured to determine a required acceleration rate profile in dependence at least in part on the signals indicative of turning of a vehicle and driving condition, the system being configured to cause the rate of acceleration of the vehicle to follow the required acceleration profile in order to cause vehicle speed to become substantially equal to the target speed when a difference exists between vehicle speed and target speed.

13. The system according to claim 1, wherein the controller is configured to determine a required acceleration rate profile in dependence at least in part on a determination whether the target speed is greater than or less than instant vehicle speed.

14. A vehicle comprising a speed control system for a vehicle, comprising:
an electric controller configured automatically cause the vehicle to operate in accordance with a target speed value, the electric controller configured to receive electrical signals indicative of turning of a vehicle and a driving condition of the vehicle, and
to adjust automatically the value of the target speed value in dependence on both said electrical signal indicative of turning of a vehicle and said electrical signal indicative of a driving condition of the vehicle, wherein the electrical signal indicative of a driving condition of the vehicle comprises a signal relating to at least one of a driving mode in which a vehicle is operating and a driving surface over which a vehicle is driving.

15. A method of controlling a vehicle, comprising:
automatically causing a vehicle to operate in accordance with a target speed value;
receiving information relating to turning of a vehicle;
receiving information relating to a driving condition; and
adjusting automatically the value of the target speed value in dependence both on said information relating to turning of a vehicle and on said information relating to a driving condition, wherein receiving information relating to driving condition comprises receiving information relating to one or more of: a driving mode in which a vehicle is operating and a driving surface over which a vehicle is driving.

16. The method according to claim 15, wherein receiving information relating to turning of a vehicle comprises receiving information relating to steering angle and an amount of lateral acceleration of a vehicle.

17. The method according to claim 15, wherein receiving information relating to driving condition comprises receiving information relating to a driving surface over which a vehicle is driving and wherein receiving information relating to a driving surface comprises obtaining the information relating to a driving surface by reference to at least one selected from among one or more images captured by a camera device, a value of coefficient of friction between a driving surface and vehicle wheel, vehicle pitch attitude, vehicle roll attitude, suspension articulation, driving surface roughness, movement of a body of a vehicle and movement of a body of a vehicle occupant relative to a body of a vehicle.

18. The method according to claim 15, wherein receiving information relating to a driving mode comprises one or more of receiving information relating to a state of a user-operable driving mode control input for selecting a driving mode of a vehicle, and receiving information relating to a state of an automatically selected driving mode wherein the method comprising selecting automatically, by means of automatic driving mode selection means, a driving mode appropriate to a driving surface over which a vehicle is driving in dependence on a user-operable automatic driving mode control input for selecting operation of the system in the automatic driving mode selection mode.

19. The method according to claim 15, comprising:
determining a turning maximum speed value in dependence at least in part on the information relating to turning of a vehicle and the information relating to driving condition, and
determining at least one further maximum speed value,
the method comprising causing the value of target speed to be set to the lower of the turning maximum speed value and the at least one further maximum speed value.

20. A non-transient carrier medium carrying computer readable code for controlling a vehicle to carry out the method of:
automatically causing a vehicle to operate in accordance with a target speed value;
receiving information relating to turning of a vehicle;
receiving information relating to a driving condition; and
adjusting automatically the value of the target speed value in dependence both on said information relating to turning of a vehicle and on said information relating to a driving condition, wherein receiving information relating to driving condition comprises receiving information relating to a driving mode in which a vehicle is operating.

* * * * *